(12) United States Patent
Köcher et al.

(10) Patent No.: US 10,590,229 B2
(45) Date of Patent: Mar. 17, 2020

(54) POLYURETHANE COATING COMPOSITIONS

(71) Applicant: Covestro Deutschland AG, Leverkusen (DE)

(72) Inventors: Jürgen Köcher, Langenfeld (DE); Tanja Hebestreit, Wipperfürth (DE); Christoph Eggert, Köln (DE)

(73) Assignee: Covestro Deutschland AG, Leverkusen (DE)

( * ) Notice: Subject to any disclaimer, the term of this patent is extended or adjusted under 35 U.S.C. 154(b) by 18 days.

(21) Appl. No.: 15/574,036

(22) PCT Filed: May 17, 2016

(86) PCT No.: PCT/EP2016/061019
§ 371 (c)(1),
(2) Date: Nov. 14, 2017

(87) PCT Pub. No.: WO2016/184853
PCT Pub. Date: Nov. 24, 2016

(65) Prior Publication Data
US 2018/0298138 A1    Oct. 18, 2018

(30) Foreign Application Priority Data
May 21, 2015   (EP) ................................. 15168764

(51) Int. Cl.
| | |
|---|---|
| *C08G 18/46* | (2006.01) |
| *C08G 18/28* | (2006.01) |
| *C08G 18/73* | (2006.01) |
| *C08G 18/79* | (2006.01) |
| *C08G 18/80* | (2006.01) |
| *C09D 175/04* | (2006.01) |
| *C08G 18/32* | (2006.01) |
| *C08G 18/77* | (2006.01) |
| *C08G 18/38* | (2006.01) |
| *C08G 18/10* | (2006.01) |
| *C08G 18/62* | (2006.01) |

(52) U.S. Cl.
CPC ........... *C08G 18/289* (2013.01); *C08G 18/10* (2013.01); *C08G 18/3206* (2013.01); *C08G 18/3893* (2013.01); *C08G 18/4692* (2013.01); *C08G 18/6241* (2013.01); *C08G 18/73* (2013.01); *C08G 18/778* (2013.01); *C08G 18/792* (2013.01); *C08G 18/809* (2013.01); *C08G 18/8012* (2013.01); *C09D 175/04* (2013.01)

(58) Field of Classification Search
CPC ............ C09D 175/04; C08G 18/289; C08G 18/3893; C08G 18/4692; C08G 18/719; C08G 18/778; C08G 18/8012
See application file for complete search history.

(56) References Cited

U.S. PATENT DOCUMENTS

| | | | |
|---|---|---|---|
| 4,246,382 A | 1/1981 | Honda et al. | |
| 4,598,131 A | 7/1986 | Prucnal | |
| 4,754,914 A | 7/1988 | Wischusen, III | |
| 4,895,910 A | 1/1990 | Isozaki et al. | |
| 5,079,312 A | 1/1992 | Isozaki et al. | |
| 5,576,386 A | 11/1996 | Kempter et al. | |
| 5,686,531 A | 11/1997 | Engelke et al. | |
| 5,690,569 A | 11/1997 | Ledvina et al. | |
| 5,726,258 A | 3/1998 | Fischer et al. | |
| 5,990,221 A | 11/1999 | Dames et al. | |
| 6,160,049 A | 12/2000 | Mathauer et al. | |
| 6,309,707 B1 | 10/2001 | Mayer et al. | |
| 6,410,646 B1 | 6/2002 | Röckrath et al. | |
| 6,492,482 B2* | 12/2002 | Lomoelder | C08G 18/809 524/589 |
| 6,730,768 B2 | 5/2004 | Heidbreder et al. | |
| 7,019,052 B1 | 3/2006 | Rink et al. | |
| 7,122,161 B1 | 10/2006 | Moritz et al. | |
| 8,013,099 B2 | 9/2011 | Poppe et al. | |
| 8,569,438 B2 | 10/2013 | Groenewolt et al. | |
| 8,679,589 B2 | 3/2014 | Groenewolt et al. | |
| 9,371,469 B2 | 6/2016 | Groenewolt et al. | |
| 2003/0027921 A1 | 2/2003 | Speier et al. | |
| 2011/0269897 A1 | 11/2011 | Groenewolt et al. | |
| 2016/0122583 A1 | 5/2016 | Groenewolt et al. | |

(Continued)

FOREIGN PATENT DOCUMENTS

| | | | |
|---|---|---|---|
| DE | 2848906 A1 | 5/1979 | |
| DE | 3706095 A1 | 8/1987 | |
| DE | 3807571 A1 | 9/1988 | |
| DE | 4421823 A1 | 1/1996 | |
| DE | 19524182 A1 | 1/1997 | |
| DE | 19709476 A1 | 11/1997 | |
| DE | 19625773 A1 | 1/1998 | |
| DE | 19628142 A1 | 1/1998 | |
| DE | 19628143 A1 | 1/1998 | |
| DE | 19709465 A1 | 9/1998 | |
| DE | 19828742 A1 | 12/1999 | |
| DE | 19850243 A1 | 5/2000 | |

(Continued)

OTHER PUBLICATIONS

International Search Report for PCT/EP2016/061019 dated Jul. 18, 2016.

(Continued)

*Primary Examiner* — Michael L Leonard
(74) *Attorney, Agent, or Firm* — Drinker Biddle & Reath LLP

(57) ABSTRACT

The present invention relates to non-aqueous coating agent compositions, containing at least one polyol (A), at least one silane-modified compound (B) of formula (I), optionally one or more silane-free aliphatic or cycloaliphatic polyisocyanates (C) having free or blocked isocyanate groups, and at least one catalyst (D) for the cross-linking of the silane groups. Furthermore, the non-aqueous coating agent compositions according to the invention can contain one or more surface additives (E) and one or more non-aqueous solvents (F).

12 Claims, No Drawings

(56) References Cited

U.S. PATENT DOCUMENTS

| | | |
|---|---|---|
| 2016/0340372 A1 | 11/2016 | Eggert |
| 2016/0369036 A1 | 12/2016 | Kramer et al. |

FOREIGN PATENT DOCUMENTS

| | | |
|---|---|---|
| EP | 0358153 A2 | 3/1990 |
| EP | 0554783 A1 | 8/1993 |
| EP | 0689556 A1 | 1/1996 |
| EP | 0937110 A1 | 8/1999 |
| EP | 1273640 A2 | 1/2003 |
| EP | 2676982 A1 | 12/2013 |
| EP | 2735578 A1 | 5/2014 |
| EP | 2832757 A1 | 2/2015 |
| JP | 2004067835 A | 3/2004 |
| WO | WO-1982002387 A1 | 7/1982 |
| WO | WO-1992022615 A1 | 12/1992 |
| WO | WO-9421702 A1 | 9/1994 |
| WO | WO-1995027742 A1 | 10/1995 |
| WO | WO-1998002466 A1 | 1/1998 |
| WO | WO-9821255 A1 | 5/1998 |
| WO | WO-2007033786 A1 | 3/2007 |
| WO | WO-2008074489 A1 | 6/2008 |
| WO | WO-2009077181 A1 | 6/2009 |
| WO | WO-2012168079 A1 | 12/2012 |
| WO | WO-2014086530 A1 | 6/2014 |
| WO | WO-2015113919 A1 | 8/2015 |

OTHER PUBLICATIONS

Written Opinion of the International Searching Authority for PCT/EP2016/061019 dated Jul. 18, 2016.

International Preliminary Report for Patentability with Written Opinion for International Application No. PCT/EP2016/061019, dated Nov. 30, 2017.

\* cited by examiner

POLYURETHANE COATING COMPOSITIONS

CROSS-REFERENCE TO RELATED APPLICATIONS

This application is a national stage application (under 35 U.S.C. § 371) of PCT/EP2016/061019, filed May 17, 2016, which claims benefit of European Application No. 15168764.7, filed May 21, 2015, both of which are incorporated herein by reference in their entirety.

TECHNICAL FIELD OF THE INVENTION

The present invention relates to nonaqueous coating material compositions comprising at least one polyol (A), at least one silane-modified compound (B) of the formula (I), optionally one or more silane-free aliphatic or cycloaliphatic polyisocyanates (C) having free or blocked isocyanate groups, and at least one catalyst (D) for the crosslinking of the silane groups, at least one of the two components (B) and (C) necessarily including free or blocked isocyanate groups. The nonaqueous coating material compositions of the invention may further comprise one or more surface additives (E) and solvents (F). The coating assistants of the invention are particularly suitable for automobile paints, more particularly original automotive finishes (known as OEM coatings).

BACKGROUND OF THE INVENTION

Two-component polyurethane (PU) coating materials are used for top coating in the automobile industry on account of their high resistance to environmental effects, particularly acid rain, by comparison with conventional coating systems crosslinked with amino resin (W. Wieczorrek in: Stoye/Freitag, Lackharze [resins for coatings], p. 215 if, C. Hanser-Verlag, 1996; J. W. Holubka et al., J. Coat. Tech. Vol. 72, No. 901, p. 77, 2000). Used here in general are OH-functional poly(meth)acrylate resins and polyisocyanates based on hexamethylene diisocyanate (HDI). The use of other diisocyanates or other diisocyanate derivatives is likewise possible.

Work has been ongoing on the development of new automotive clearcoat materials for many years. In view of the rising quality requirements in the automobile industry, work is ongoing in particular into improving the resistance toward environmental influences, and high mechanical stability, particularly the scratch resistance.

One possibility of improving the scratch resistance of two-component polyurethane coatings is to introduce trialkoxysilane groups into the coating components. These silane components are capable of raising the stability of polyurethane coatings by crosslinking and formation of siloxane networks. This principle is taught by EP 1 273 640. This publication describes two-component (2K) coating materials comprising a polyol component and a crosslinker component, consisting of aliphatic and/or cycloaliphatic polyisocyanates or the polyisocyanates derived from them by polymerization, allophanatization, biruetization or urethanization, where 0.1 to 95 mol % of the originally free isocyanate groups present have undergone reaction with bisalkoxysilylamine. These coating materials can be used for producing clearcoat or topcoat finishes in the motor vehicle segment, and, after they have cured completely, exhibit good scratch resistance in conjunction with good resistance toward environmental effects. Sandability and polishability and also the visual impression given by the resultant coatings, however, are still capable of further improvement.

The principle of polyurethane coatings which comprise polyisocyanate compounds with proportional reaction of the isocyanate groups to form silane groups has been pursued continuously in recent years—compare, among others, patent applications WO 2007/033786, WO 2008/74489, WO 2009/077181, US 2011/0269897, WO 2012/168079 and WO 2014/086530. These texts describe various alkoxysilane-containing polyisocyanates as a component for the crosslinking with polyols. For the reaction with polyisocyanates, various monoaminosilane, bisaminosilane and mercaptosilane building blocks and also mixtures thereof are used. Besides the use of various silane building blocks, new catalysts are also described for the improved crosslinking of the silane structures.

A second approach relates to improving the scratch resistance of two-component polyurethane coatings by adding isocyanate-free, silane-terminated prepolymers. Approaches of this kind are described for example in patent applications EP 2676982 and EP 2735578.

In view of the continually increasing quality demands imposed on automotive clearcoats, there continues to be a need for new building blocks for the production of such coating formulations.

Very generally, silane-modified compounds of the type claimed here are those compounds which contain silane groups having hydrolyzable radicals, and whose polymer backbone is not constructed substantially of O—Si—O—Si chains, as is the case with the silicones, but is instead constructed from C—C chains which, in the majority of cases, are interrupted by heteroatoms and additionally contain urethane, ether, ester, urea, amide and other structural units. On exposure to moisture and/or under the influence of suitable catalysts, the radicals on the silane groups—usually, for example, acetate or alkoxy groups—are hydrolyzed, forming reactive silanols which subsequently condense and cure to form a high molecular mass network, eliminating water, alcohol or acetic acid as they do so.

Compositions which comprise silane-modified compounds are notable for qualities including a high level of adhesion to any of a very wide variety of substrates, without costly and inconvenient pretreatment (no primer necessary). The reason for this is that normally OH groups are present on inorganic substrate surfaces, and are able to react with the reactive silanols of the polymer that are formed on exposure to moisture.

The silane-modified polyurethanes and polyureas that are presently available commercially on the market are based on a high molecular mass backbone which is generated (i) by reaction of NCO-containing prepolymers with aminosilanes, or (ii) by reaction of OH-terminated prepolymers, such as polyethers, polyurethanes or polyesters, for example, with NCO-functional silanes, or (iii) by reaction of NCO-containing prepolymers with mercaptosilanes, as shown in the formula scheme below:

i)

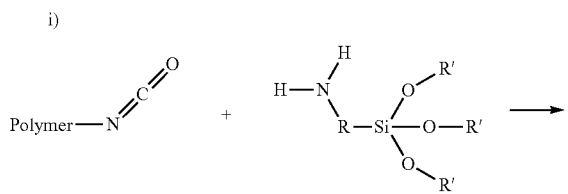

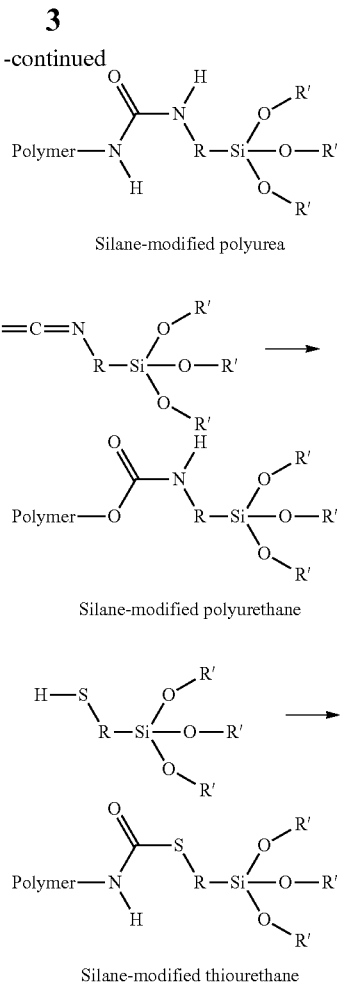

Furthermore—as already mentioned—the hardness of the resulting coating as the end product after the silane cross-linking is very important for auto paints. In the case of silane-modified polyureas, the end products normally have a high hardness; possibly, however, the coating becomes so rigid and highly crosslinked that cracks may appear. In contrast, silane-modified polyurethanes provide end products that are softer after curing. Nevertheless, the synthesis of silane-modified polyurethanes with a high silane content is difficult economically to implement, owing to the relatively expensive NCO-functionalized silane precursors.

Problem Addressed by the Invention

The problem addressed by the present invention is that of providing an improved, nonaqueous coating system composed of inexpensive and readily obtainable starting materials. The aim in particular is for nonaqueous coating material compositions having an advantageous balance of chemical properties, such as, in particular, degree of curing and stability, and having outstanding performance properties for auto paints.

SUMMARY OF THE INVENTION

A subject of the present invention are nonaqueous coating material compositions as claimed in claim 1 or as claimed in one or more preferred embodiments set out in the dependent claims or in the description hereinafter. A further subject of the invention are multistage coating methods using these coating material compositions, and also the use of the coating material compositions as clearcoat or topcoat material, and, respectively, the application of the coating method for the OEM finishing of motor vehicles and/or of utility vehicles.

Surprisingly it has emerged that the coating material compositions of the invention lead to coatings which have a profile of properties that makes them particularly suitable for auto paints. This profile of properties includes, during formulation, good processing qualities, and, after baking of the coating material, a high degree of wet and dry scratch resistance, in particular an outstanding retention of gloss after scratch exposure, but at the same time a good solvent resistance and a low pendulum damping as well. The resultant coatings show a very good overall visual impression.

Definitions

As used in this application, the term "aliphatic" is to stand for optionally substituted, linear or branched, alkyl, alkenyl and alkynyl groups, in which nonadjacent methylene groups (—$CH_2$—) may be replaced by heteroatoms, such as oxygen and sulfur in particular, or by secondary amino groups.

As used in this application, the term "alicyclic" or "cycloaliphatic" is to stand for optionally substituted carbocyclic or heterocyclic compounds which are not included in the aromatic compounds, such as, for example, cycloalkanes, cycloalkenes or oxa-, thia-, aza- or thiazacycloalkanes. Specific examples thereof are cyclohexyl groups, cyclopentyl groups, and also the derivatives thereof that are interrupted by one or two N or O atoms, such as pyrimidine, pyrazine, tetrahydropyran or tetrahydrofuran. Further examples of alicyclic groups are polyisocyanates having ring structures such as iminooxadiazinedione, oxadiazinetrione, oxazolidinone, allophanate, cyclic isocyanurate, cyclic uretdione, cyclic urethane, cyclic biuret, cyclic urea, acyl urea and/or carbodiimide structures.

As used in this application, the term "optionally substituted" or "substituted" is intended to stand in particular for substitution of the relevant structural unit by —F, —Cl, —I, —Br, —OH, —$OCH_3$, —$OCH_2CH_3$, —O-isopropyl or —O-n-propyl, —$OCF_3$, —$CF_3$, —S—$C_{1-6}$-alkyl and/or another linear or branched, aliphatic and/or alicyclic structural unit having 1 to 12 carbon atoms and optionally linked via a heteroatom. It preferably stands for substitution by halogen (especially —F, —Cl), $C_{1-6}$-alkoxy (especially methoxy and ethoxy), hydroxyl, trifluoromethyl and trifluoromethoxy.

As used in this application, the term "low molecular mass" is to stand for compounds whose molecular mass is up to 800 g·mol$^{-1}$.

As used in this application, the term "high molecular mass" is to stand for compounds whose molecular mass exceeds 800 g·mol$^{-1}$.

In the case of compounds whose molecular mass does not arise from a precisely defined structural formula, as in the case of polymers, for example, molecular mass refers in each case to the number-average molecular weight.

As used in this application, the term "polyisocyanate" is to stand for aliphatic or cycloaliphatic polyisocyanates with an NCO functionality of >1, preferably ≥2, more particularly di- and triisocyanates.

As used in this application, the term "monomer" is to stand for a low molecular mass compound having functional groups that participates in the synthesis of oligomers and/or (pre)polymers and possesses a defined molar mass.

As used in this application, the term "oligomer" is to stand for a compound in which only a few (i.e. ≤10) monomers of same or different kind are linked repeatedly to one another.

As used in this application, the term "prepolymer" is to stand for oligomeric compounds having functional groups which are involved in the final construction of polymers. In particular it comprises—as is usual in polyurethane chemistry—compounds which contain at least one diisocyanate unit and at least one diol unit and are polymerizable further via the functional groups of these units.

As used in this application, the term "polymer" is to stand for high molecular mass units in which monomers, oligomers and/or prepolymers of same or different kind are linked repeatedly to one another, and which may differ in terms of degree of polymerization, molar mass distribution and/or chain length.

In this application, the term "compound" also embraces oligomers and prepolymers.

For the purposes of this application, the term "blocked" signifies "reversibly blocked". Accordingly, for example, isocyanate can be released again from a blocked isocyanate group by heating; blocked isocyanate groups therefore continue to be reactive with polyols. A blocked isocyanate is typically understood as an addition compound of a highly reactive isocyanate with an alcohol (to form a urethane) or with an amine (to form a urea), which at higher temperatures breaks down again into alcohol or amine, respectively, and into isocyanate. Known blocking agents are, for example, acetoacetic acid, malonic esters, 3,5-dimethylpyrazole, butanone oxime, secondary amines, caprolactam, or various alcohols.

Unless indicated otherwise by the context, the term "isocyanate group" in this application always embraces free isocyanate groups (—NCO) and blocked isocyanate groups.

As used in the application, a secondary "formamidosilane" is a compound of the following structural formula:

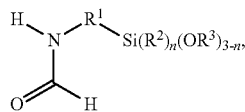

where $R^1$, $R^2$, $R^3$ and n are as defined in claim 1. A "formamidosilane group", accordingly, is generally represented as follows:

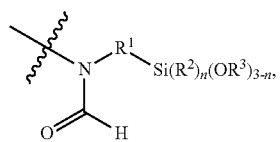

where $R^1$, $R^2$, $R^3$ and n are as defined in claim 1.

If the nitrogen atom is substituted by three carbon atoms, the term "tertiary formamidosilane" or "tertiary formamidosilane group" is used. Correspondingly, reference is made to a secondary formamidosilane or a secondary formamidosilane group when the nitrogen atom is substituted by two carbon atoms.

DETAILED DESCRIPTION OF THE INVENTION

The present invention relates to nonaqueous coating material compositions comprising at least one polyhydroxyl-group-containing compound (A), at least one silane-modified compound B of the formula (I), as defined in claim 1, optionally one or more silane-free, aliphatic or cycloaliphatic polyisocyanates (C) having free or blocked isocyanate groups, and at least one catalyst (D) for the crosslinking of the silane groups. Furthermore, the nonaqueous coating material compositions of the invention may comprise one or more rheological assistants (E) and one or more nonaqueous solvents (F). The nonaqueous coating material compositions of the invention may comprise further constituents as set out below; in one preferred embodiment, however, they consist only of the constituents (A) to (F), or of a subgroup thereof, e.g., of (A), (B), (C) and (D), of (A), (B), (C), (D) and (E), of (A), (B), (D), (E) and (F), of (A), (B), (D) and (E), or only of (A), (B) and (D).

In the coating material compositions of the invention, at least one of the two components (B) and (C) must contain free or blocked isocyanate groups. If the composition contains no component (C), therefore, component (B) must be selected such that it still has isocyanate groups, via which the crosslinking with the polyol component (A) takes place subsequently.

The components are described in detail below.

Component (A)—Polyol

As essential component (A), the coating material compositions of the invention first comprise a compound having two or more hydroxyl groups (in the literature also called polyhydroxyl-group-containing compound, or polyol for short).

Examples of suitable oligomeric or polymeric compounds which contain at least one, more particularly at least two, isocyanate-reactive hydroxy-functional group(s) and can be used as component (A) in the present invention are linear and/or branched and/or blockwise-, comblike- and/or randomly constructed oligomers or polymers, such as (meth) acrylate (co)polymers, polyesters, alkyds, amino resins, polyurethanes, polylactones, polycarbonates, polyethers, epoxy resin-amine adducts, (meth)acrylate diols, partially hydrolyzed polyvinyl esters or polyureas, of which the (meth)acrylate copolymers, the polyesters, the polyurethanes, the polyethers and the epoxy resin-amine adducts, but especially (meth)acrylate (co)polymers and polyesters, are advantageous.

Component A preferably comprises at least one hydroxy-functional polyester (or polyester polyol) having a hydroxyl number of 20 to 240 mg KOH/g, preferably 30 to 200 mg KOH/g and more preferably 40 to 160 mg KOH/g. The acid number is below 20 mg KOH/g, preferably below 15 mg KOH/g and more preferably below 12 mg KOH/g. The glass transition temperature of component A is −40 to +100° C., preferably 30 to +80° C. and more preferably −30 to +70° C. The molecular weight of the polyester polyols, as calculable from the stoichiometry of the starting materials used, is about 460 to 11300 g/mol, preferably about 570 to 7500 g/mol and more preferably about 700 to 5700 g/mol. In the preparation of the hydroxy-functional polyesters, a total of six groups of monomer constituents may be employed:

1) (cyclo)alkanediols (i.e., dihydric alcohols having (cyclo) aliphatically attached hydroxyl groups) of the molecular weight range 62 to 286 g/mol, such as, for example, ethanediol, 1,2- and 1,3-propanediol, 1,2-, 1,3- and 1,4-butanediol, 1,5-pentanediol, 1,6-hexanediol, neopentyl glycol, cyclohexane-1,4-dimethanol, 1,2- and 1,4-cyclohexanediol, 2-ethyl-2-butylpropanediol, diols containing ether oxygen, such as diethylene glycol, triethylene glycol, tetraethylene glycol, dipropylene glycol, tripropylene glycol, polyethylene, polypropylene or polybutylene glycols having a maximum molecular weight of about 2000 g/mol, preferably about 1000 g/mol and more preferably about 500 g/mol. Reaction products of the aforementioned diols with ε-caprolactone may likewise be employed as diols.

2) Alcohols of the molecular weight range 92 to 254 g/mol with a functionality of three or more, such as glycerol, trimethylolpropane, pentaerythritol, dipentaerythritol and sorbitol.

3) Monoalcohols, such as ethanol, 1- and 2-propanol, 1- and 2-butanol, 1-hexanol, 2-ethylhexanol, cyclohexanol and benzyl alcohol.

4) Dicarboxylic acids of the molecular weight range 116 to about 600 g/mol and/or their anhydrides, such as phthalic acid, phthalic anhydride, isophthalic acid, tetrahydrophthalic acid, tetrahydrophthalic anhydride, hexahydrophthalic acid, hexahydrophthalic anhydride, maleic anhydride, fumaric acid, succinic acid, succinic anhydride, adipic acid, dodecanedioic acid, hydrogenated dimer fatty acids.

5) More highly polyfunctional carboxylic acids and/or their anhydrides, such as trimellitic acid and trimellitic anhydride.

6) Monocarboxylic acids, such as benzoic acid, cyclohexane carboxylic acid, 2-ethylhexanoic acid, caproic acid, caprylic acid, capric acid, lauric acid, natural and synthetic fatty acids.

Further preferred hydroxy-functional components are (meth)acrylate copolymers. Especially suitable (meth)acrylate copolymers have an OH number of 100 to 220, preferably 130 to 200, more preferably 140 to 190 and especially 145 to 180 mg KOH/g, a glass transition temperature of −35° to +60° C., especially −25° to +40° C., a number-average molecular weight of 1,000 to 10,000 Daltons, especially 1,500 to 5,000 Daltons, and a mass-average molecular weight of 2,000 to 40,000 Daltons, especially 3,000 to 20,000 Daltons.

The (meth)acrylate copolymers contain in copolymerized form an amount of hydroxyl-group-containing, olefinically unsaturated monomers (a) that corresponds to their OH number, of which (a1) 20 to 90 wt %, preferably 22 to 85 wt %, more preferably 25 to 80 wt % and especially 28 to 75 wt %, based in each case on the hydroxyl-group-containing monomers (a), are selected from the group consisting of 4-hydroxybutyl(meth)acrylate and 2-alkylpropane-1,3-diol mono(meth)acrylates, and (a2) 20 to 80 wt %, preferably 15 to 78 wt %, more preferably 20 to 75 wt % and especially 25 to 72 wt %, based in each case on the hydroxyl-group-containing monomers (a), are selected from the group consisting of other hydroxyl-group-containing, olefinically unsaturated monomers.

Examples of suitable 2-alkylpropane-1,3-diol-mono(meth)acrylates (a1) are 2-methyl-, 2-ethyl-, 2-propyl-, 2-isopropyl- or 2-n-butylpropane-1,3-diolmono(meth)acrylate, of which 2-methylpropane-1,3-diol-mono(meth)acrylate is particularly advantageous and is used with preference.

Examples of suitable other hydroxyl-group-containing, olefinically unsaturated monomers (a2) are hydroxyalkyl esters of olefinically unsaturated carboxylic, sulfonic and phosphonic acids and acidic phosphoric and sulfuric esters, more particularly carboxylic acids, such as acrylic acid, beta-carboxyethyl acrylate, methacrylic acid, ethacrylic acid and crotonic acid, especially acrylic acid and methacrylic acid. They derive from an alkylene glycol which is esterified with the acid, or they are obtainable by the reaction of the acid with an alkylene oxide, such as ethylene oxide or propylene oxide. The hydroxyalkyl esters used with preference are those in which the hydroxyalkyl group contains up to 20 carbon atoms, more particularly 2-hydroxyethyl or 3-hydroxypropyl acrylate or methacrylate; 1A-bis(hydroxymethyl)cyclohexane- or octahydro-4,7-methano-1H-indene-dimethanol monoacrylate or monomethacrylate; or reaction products of cyclic esters, such as ε-caprolactone and its hydroxyalkyl esters; or olefinically unsaturated alcohols such as allyl alcohols; or polyols, such as trimethylolpropane monoallyl or diallyl ether or pentaerythritol monoallyl, diallyl or triallyl ether.

These more highly polyfunctional monomers (a2) are generally used only in minor amounts. In the context of the present invention, "minor amounts" of more highly polyfunctional monomers (a2) here refers to amounts which do not lead to the crosslinking or gelling of the (meth)acrylate copolymers A, unless they are intended to be in the form of crosslinked microgel particles.

Additionally contemplated are ethoxylated and/or propoxylated allyl alcohol, which is sold by Arco Chemicals, or 2-hydroxyalkyl allyl ethers, especially 2-hydroxyethyl allyl ether, as monomer (a2). Where used, they are employed preferably not as sole monomers (a2), but instead in an amount of 0.1 to 10 wt %, based on the (meth)acrylate copolymer.

Additionally contemplated are reaction products of the above-recited olefinically unsaturated acids, especially acrylic acid and/or methacrylic acid, with the glycidyl ester of an alpha-branched monocarboxylic acid having 5 to 18 carbon atoms per molecule, more particularly a Versatic® acid, or, instead of the reaction products, an equivalent amount of the above-recited olefinically unsaturated acids, especially acrylic and/or methacrylic acid, which then, during or after the polymerization reaction, is reacted with the glycidyl ester of an alpha-branched monocarboxylic acid having 5 to 18 carbons per molecule, more particularly a Versatic® acid (cf. Römpp Lexikon Lacke und Druckfarben, Georg Thieme Verlag, Stuttgart, New York, 1998, "Versatic® acids", pages 605 and 606).

Suitable not least are acryloyloxysilane-containing vinyl monomers as monomers (a2), preparable by reaction of hydroxy-functional silanes with epichlorohydrin and subsequent reaction of the reaction product with (meth)acrylic acid and/or hydroxyalkyl and/or hydroxycycloalkyl esters of (meth)acrylic acid and/or further hydroxyl-group-containing monomers (a1) and (a2).

Apart from the hydroxyl groups, the (meth)acrylate copolymers may also contain other isocyanate-reactive functional groups, such as primary and secondary amino groups.

Apart from the above-described isocyanate-reactive functional groups, the (meth)acrylate copolymers may also contain additional, thermally activatable, reactive functional groups, such as carboxyl groups, methylol ether groups, epoxide groups and/or blocked isocyanate groups, in minor amounts.

Examples of suitable olefinically unsaturated monomers (a3), which can be used to introduce isocyanate-reactive amino groups and additional, thermally activatable, reactive functional groups into the (meth)acrylate copolymers are (a31) monomers which carry at least one amino group per molecule, such as aminoethyl acrylate, aminoethyl methacrylate, allylamine or N-methylaminoethyl acrylate; and/or (a32) monomers which carry at least one acid group per molecule, such as acrylic acid, β-carboxyethyl acrylate, methacrylic acid, ethacrylic acid, crotonic acid, maleic acid, fumaric acid or itaconic acid; olefinically unsaturated sulfonic or phosphonic acids or their partial esters; mono(meth) acryloyloxyethyl maleate, mono(meth)acryloyloxyethyl succinate, mono(meth)acryloyloxyethyl phthalate; or vinylbenzoic acid and methylvinylbenzoic acid, and also vinylbenzenesulfonic acid (all isomers in each case);

(a33) monomers containing epoxide groups, such as the glycidyl ester of acrylic acid, methacrylic acid, ethacrylic acid, crotonic acid, maleic acid, fumaric acid or itaconic acid, or allyl glycidyl ether.

Furthermore, the (meth)acrylate copolymers may also contain in copolymerized form at least one olefinically unsaturated monomer (a4) which is substantially or entirely free from reactive functional groups, such as:

Monomers (a41):

Substantially acid-group-free (meth)acrylic esters, such as alkyl or cycloalkyl esters of (meth)acrylic acid having up to 20 carbon atoms in the alkyl radical, especially methyl, ethyl, n-propyl, n-butyl, sec-butyl, tert-butyl, hexyl, ethylhexyl, stearyl und lauryl acrylate or methacrylate; cycloaliphatic (meth)acrylic esters, especially cyclohexyl, isobornyl, dicyclopentadienyl, octahydro-4,7-methano-1H-indenemethanol or tertbutylcyclohexyl(meth)acrylate; oxaalkyl or oxacycloalkyl esters of (meth)acrylic acid, such as ethoxytriglycol (meth)acrylate and methoxy oligoglycol (meth)acrylate with a molecular weight $M_n$ of preferably 550 g/mol, or other ethoxylated and/or propoxylated, hydroxyl-group-free (meth)acrylic acid derivatives (further examples of suitable monomers (31) of this kind are known from laid-open specification DE 196 25 773 A 1, column 3, line 65 to column 4, line 20). These may include, in minor amounts, (meth)acrylic acid alkyl or cycloalkyl esters of higher functionality, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. Here, minor amounts of higher polyfunctional monomers (a41) mean amounts which do not lead to the crosslinking or gelling of the copolymers, unless they are in the form of crosslinked microgel particles.

Monomers (a42):

Vinyl esters of alpha-branched monocarboxylic acids having 5 to 18 carbons in the molecule. The branched monocarboxylic acids can be obtained by reaction of formic acid or carbon monoxide and water with olefins in the presence of a liquid, strongly acidic catalyst; the olefins may be cracking products of paraffinic hydrocarbons, such as mineral oil fractions, and may include not only branched but also straight-chain acyclic and/or cycloaliphatic olefins. In the reaction of such olefins with formic acid, or with carbon monoxide and water, a mixture of carboxylic acids is formed in which the carboxyl groups are located primarily on a quaternary carbon atom. Other olefinic starting materials are, for example, propylene trimer, propylene tetramer and diisobutylene. The vinyl esters may alternatively be prepared in a conventional way from the acids, for example by reacting the acid with acetylene.

Particularly preferred for use on account of their ready availability are vinyl esters of saturated aliphatic monocarboxylic acids having 9 to 11 carbons that are branched on the alpha carbon. Vinyl esters of this kind are sold under the brand name VeoVa® (cf. also Römpp Lexikon Lacke und Druckfarben, Georg Thieme Verlag, Stuttgart, New York, 1998, page 598).

Monomers (a 43):

Nitriles, such as acrylonitrile and/or methacrylonitrile.

Monomers (a44):

Vinyl compounds, especially vinyl halides and/or vinylidene dihalides, such as vinyl chloride, vinyl fluoride, vinylidene dichloride or vinylidene difluoride; N-vinylamides, such as vinyl-N-methylformamide, N-vinylcaprolactam or N-vinylpyrrolidone; 1-vinylimidazol; vinyl ethers, such as ethyl vinyl ether, n-propyl vinyl ether, isopropyl vinyl ether, n-butyl vinyl ether, isobutyl vinyl ether and/or vinyl cyclohexyl ether, and/or vinyl esters, such as vinyl acetate, vinyl propionate, vinyl butyrate, vinyl pivalate and/or the vinyl ester of 2-methyl-2-ethylheptanoic acid.

Monomers (a 45):

Allyl compounds, especially allyl ethers and allyl esters such as allyl methyl, ethyl, propyl or butyl ether or allyl acetate, propionate or butyrate.

Monomers (a 46):

Polysiloxane macromonomers which have a number-average molecular weight Mn of 1,000 to 40,000 g/mol and on average 0.5 to 2.5 ethylenically unsaturated double bonds per molecule; especially polysiloxane macromonomers which have a number-average molecular weight $M_n$ of 2,000 to 20,000 g/mol, more preferably 2,500 to 10,000 g/mol and more particularly 3,000 to 7,000 g/mol and on average 0.5 to 2.5, preferably 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,914 A1 in columns 5 to 9, in DE 44 21 823 A1 or in the international patent application WO 1992/22615 on page 12, line 18, to page 18, line 10.

The monomers (a1) and (a2) and also (a3) and/or (a4) are selected such that the above-stated OH numbers and glass transition temperatures result. The selection of the monomers (a) for establishing the glass transition temperatures may be undertaken by the skilled person with the aid of the following formula of Fox, which can be used to calculate approximately the glass transition temperatures of poly (meth)acrylates:

$$n=x$$
$$1/Tg = \Sigma W_n/Tg_n; \Sigma_n W_n = 1 n=1$$

Tg=glass transition temperature of the poly(meth)acrylate;
$W_n$=weight fraction of the nth monomer;
$Tg_n$=glass transition temperature of the homopolymer of the nth
Monomer and x=number of different monomers.

The preparation of the (meth)acrylate copolymers used with preference in the invention has no procedural particularities but instead takes place with the aid of the methods customary and known in the polymers field for continuous or batchwise, radically initiated copolymerization in bulk, solution, emulsion, mini emulsion or micro emulsion, under atmospheric or superatmospheric pressure, in stirred tanks, autoclaves, tubular reactors, loop reactors or Taylor reactors, at temperatures of preferably 50 to 200° C.

Examples of suitable copolymerization processes are described in published applications DE 197 09 465 A1, DE 197 09 476 A1, DE 28 48 906 A1, DE 195 24 182 A1, DE 198 28742 A1, DE 196 28143 A1, DE 196 28 142 A1, EP 0 554 783 A1, WO 1995/27742, WO 1982/02387 or WO 1998/02466. The copolymerization may alternatively be conducted in polyols as reaction medium, as described for example in German patent application DE 198 50 243 A1. Examples of suitable radical initiators are dialkyl peroxides, such as ditert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, for example azodinitriles such as azobisisobutyronitrile; C—C-cleaving initiators such as benzopinacol silyl ethers; or a combination of a nonoxidizing initiator with hydrogen peroxide. Combinations of the above-described initiators may also be used.

Further examples of suitable initiators are described in German patent application DE 196 28 142 A1, page 3, line 49, to page 4, line 6. Comparatively large amounts of radical initiator are preferably added, with the fraction of the initiator in the reaction mixture, based in each case on the total amount of the monomers (a) and of the initiator, being more preferably 0.2 to 20 wt %, very preferably 0.5 to 15 wt % and more particularly 1.0 to 10 wt %.

It is possible, furthermore, for thiocarbonylthio compounds or mercaptans such as dodecyl mercaptan to be used as chain transfer agents or regulators of molecular weight.

Suitable for example are Setalux 1774 SS-65, Setalux D A 665 BA, Setalux D A 870 BA, Setalux D A 365 BA/X, Setalux D A HS 1170 BA, Setalux D A 760 BA/X from Nuplex.

Aliphatic polycarbonate polyols as well are contemplated for the synthesis of the prepolymers of the invention. Polycarbonate polyols can be obtained, as is known, from the condensation reaction of phosgene with polyols or the transesterification of suitable organic carbonates with polyols. Organic carbonates contemplated include alkyl and alkylene carbonates and mixtures thereof. Examples include dimethyl carbonate (DMC), diethyl carbonate (DEC) and ethylene carbonate. Polyols contemplated are those stated above in the section on polyester polyols. The functionality of the polycarbonate polyols used is preferably 1.6 to 3.8, more preferably 1.8 to 3.5. These polycarbonate polyols have a number-average molar weight of preferably 100 to 6000 g/mol and more preferably of 100 to 4000 g/mol. The OH number is dependent on the functionality of the polycarbonate polyols and is typically 20 to 900 mg KOH/g.

Further suitable polyols are, for example, also those described in EP 0 689 556 and EP 0 937 110, for example specific polyols obtainable through reaction of epoxidized fatty acid esters with aliphatic or aromatic polyols, opening the epoxide ring.

Polybutadienes containing hydroxyl groups can likewise serve as polyols.

Component B

As essential component (B), the coating material compositions of the invention comprise at least one silane-modified compound of the formula (I), more particularly a compound of the formula (II), as defined in the claims in each case. Below, such compounds of the formula (I) or (II) are abbreviated, on the basis of their silane modification (especially silane termination) to STP. In the ultimately fully cured state, the invention provides polyurethane (PU) polymers condensed via —Si—O—Si— bridges as permanent coatings.

The component (B) employed in accordance with the invention comprises at least one silane-modified compound (i.e. compound containing tertiary silane formamide groups) of the formula (I):

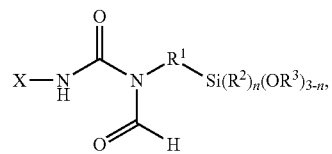

Formula (I)

where in the formula (I):
X is an organic molecule residue, more particularly an optionally substituted, linear or branched, aliphatic or cycloaliphatic organic molecule residue;
$R^1$ is an at least divalent, optionally substituted, linear or branched, aliphatic and/or alicyclic structural unit having 1 to 12 carbon atoms, it being possible for one or more nonadjacent methylene groups to be replaced in each case by O or S;
$R^2$ and $R^3$ each independently of one another are an optionally substituted, linear or branched, aliphatic and/or alicyclic group having 1 to 12 carbon atoms; and
n is an integer from 0 to 2.

In particular, in accordance with the invention, in one preferred embodiment, a compound of the formula (II) is used as silane-modified component (B):

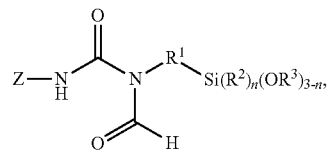

Formula (II)

where in the formula (II):
Z is a molecule residue which consists of (i) a polyisocyanate or (ii) an NCO-containing polyurethane prepolymer, at least one NCO group of the stated structures in (i) or (ii) being modified, per molecule, with a secondary formamidosilane so that a compound of the formula (II) is formed; and
$R^1$, $R^2$, $R^3$ and n are as defined above.

The acyclic and/or aliphatic polyisocyanates serving as parent structures Z for the compounds (B) containing polyisocyanate groups are preferably substituted or unsubstituted aliphatic polyisocyanates that are known per se. Examples of preferred polyisocyanates are tetramethylene 1,4-diisocyanate, pentane 1,5-diisocyanate, hexamethylene 1,6-diisocyanate, 2,2,4-trimethylhexane 1,6-diisocyanate, ethylene diisocyanate, dodecane 1,12-diisocyanate, 3-isocyanatomethyl-3,5,5-trimethylcyclohexyl isocyanate (isophorone diisocyanate, IPDI), bis(4-isocyanatocyclohexyl)methane ($H_{12}$MDI) and mixtures of the aforesaid polyisocyanates. Additionally preferred polyisocyanate parent structures for component (B) are the polyisocyanate derived from an acyclic aliphatic polyisocyanate of this kind by trimerization, dimerization, urethanization, biuretization, uretdionization and/or allophanatization, more particularly the biuret dimer and/or the allophanate dimer and/or the isocyanurate trimer.

In a further embodiment, the polyisocyanate parent structures for component (B) are polyisocyanate prepolymers having urethane structural units, which are obtained by reaction of polyols with a stoichiometric excess of aforesaid acyclic and/or aliphatic polyisocyanates. Polyisocyanate prepolymers of this kind are described for example in U.S. Pat. No. 4,598,131.

Polyisocyanates for preparing the prepolymers may be the polyisocyanates stated above.

Polymeric polyols which are usable for preparing the prepolymers have a number-average molecular weight $M_n$ of 400 g/mol to 8000 g/mol, preferably of 400 g/mol to 6000 g/mol and more preferably of 400 g/mol to 3000 g/mol. Their hydroxyl number is 22 to 400 mg KOH/g, preferably 30 to 300 mg KOH/g and more preferably 40 to 250 mg KOH/g and they have an OH functionality of 1.5 to 6, preferably of 1.7 to 5 and more preferably of 2.0 to 5.

Polyols for preparing the prepolymers are the organic polyhydroxyl compounds known in polyurethane coating technology, for example the standard polyester polyols, polyacrylate polyols, polyurethane polyols, polycarbonate polyols, polyether polyols, polyester polyacrylate polyols and polyurethane polyacrylate polyols, polyurethane polyester polyols, polyurethane polyether polyols, polyurethane polycarbonate polyols, polyester polycarbonate polyols, phenol/formaldehyde resins, alone or in mixtures. Preference is given to polyester polyols, polyether polyols or polycarbonate polyols, particular preference to polyether polyols.

Polyether polyols include, for example, the polyaddition products of the styrene oxides, of ethylene oxide, propylene oxide, tetrahydrofuran, butylene oxide, epichlorohydrin, and the mixed addition and grafting products thereof, and the polyether polyols obtained by condensation of polyhydric alcohols or mixtures thereof and those obtained by alkoxylation of polyhydric alcohols, amines and amino alcohols.

Suitable hydroxy-functional polyethers have OH functionalities of 1.5 to 6.0, preferably 1.8 to 3.0, OH numbers of 50 to 700 and preferably of 100 to 600 mg KOH/g of solids, and molecular weights $M_n$ of 106 to 4000 g/mol, preferably of 200 to 3500, for example alkoxylation products of hydroxy-functional starter molecules such as ethylene glycol, propylene glycol, butanediol, hexanediol, trimethylolpropane, glycerol, pentaerythritol, sorbitol or mixtures of these and also other hydroxy-functional compounds with propylene oxide or butylene oxide. Preferred as polyether components are polypropylene oxide polyols, polyethylene oxide polyols and polytetramethylene oxide polyols.

Examples of polyester polyols that are of good suitability are the polycondensates, known per se, of di- and optionally tri- and tetraols and di- and optionally tri- and tetracarboxylic acids or hydroxycarboxylic acids or lactones. Instead of the free polycarboxylic acids, it is also possible to use the corresponding polycarboxylic anhydrides or corresponding polycarboxylic esters of lower alcohols for preparation of the polyesters. Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or hydroxypivalic acid neopentyl glycol ester, preference being given to the three latter compounds. In order to achieve a functionality <2, it is possible to use proportions of polyols having a functionality of 3, for example trimethylolpropane, glycerol, erythritol, pentaerythritol, trimethylolbenzene or trishydroxyethyl isocyanurate.

Useful dicarboxylic acids include, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, 2,2-dimethylsuccinic acid. Anhydrides of these acids are likewise usable, where they exist. For the purposes of the present invention, the anhydrides are consequently covered by the expression "acid". It is also possible to use monocarboxylic acids such as benzoic acid and hexanecarboxylic acid, provided that the mean functionality of the polyol is ≥2. Saturated aliphatic or aromatic acids are preferred, such as adipic acid or isophthalic acid. One example of a polycarboxylic acid for optional additional use in smaller amounts is trimellitic acid.

Examples of hydroxycarboxylic acids that may be used as co-reactants in the preparation of a polyester polyol having terminal hydroxyl groups include hydroxycaproic acid, hydroxybutyric acid, hydroxydecanoic acid, hydroxystearic acid and the like. Usable lactones include ε-caprolactone, butyrolactone and homologs.

Preference is given to polyester polyols based on butanediol and/or neopentyl glycol and/or hexanediol and/or ethylene glycol and/or diethylene glycol with adipic acid and/or phthalic acid and/or isophthalic acid. Particular preference is given to polyester polyols based on butanediol and/or neopentyl glycol and/or hexanediol with adipic acid and/or phthalic acid.

The useful polycarbonate polyols are obtainable by reaction of carbonic acid derivatives, for example diphenyl carbonate, dimethyl carbonate or phosgene, with diols. Useful diols of this kind include, for example, ethylene glycol, propane-1,2- and 1,3-diol, butane-1,3- and 1,4-diol, hexane-1,6-diol, octane-1,8-diol, neopentyl glycol, 1,4-bis-hydroxymethylcyclohexane, 2-methylpropane-1,3-diol, 2,2,4-trimethylpentane-1,3-diol, dipropylene glycol, polypropylene glycols, dibutylene glycol, polybutylene glycols, bisphenol A, tetrabromobisphenol A, but also lactone-modified diols. Preferably, the diol component contains 40% to 100% by weight of hexane-1,6-diol and/or hexanediol derivatives, preferably those having not only terminal OH groups but also ether or ester groups, for example products which are obtained by reaction of 1 mol of hexanediol with at least 1 mol, preferably 1 to 2 mol, of ε-caprolactone, or by etherification of hexanediol with itself to give di- or trihexylene glycol. It is also possible to use polyether polycarbonate polyols.

Preference is given to polycarbonate polyols based on dimethyl carbonate and hexanediol and/or butanediol and/or ε-caprolactone. Very particular preference is given to polycarbonate polyols based on dimethyl carbonate and hexanediol and/or ε-caprolactone.

In lieu of the above-described polymeric polyether, polyester or polycarbonate polyols, it is also possible to use low molecular weight polyols for preparing the isocyanate-containing prepolymers. Suitable low molecular weight polyols are short-chain aliphatic, araliphatic or cycloaliphatic diols or triols, i.e. those containing 2 to 20 carbon atoms. Examples of diols are ethylene glycol, diethylene glycol, triethylene glycol, tetraethylene glycol, dipropylene glycol, tripropylene glycol, propane-1,2-diol, propane-1,3-diol, butane-1,4-diol, neopentyl glycol, 2-ethyl-2-butylpropanediol, trimethylpentanediol, positionally isomeric diethyloctanediols, 1,3-butylene glycol, cyclohexanediol, cyclohexane-1,4-dimethanol, hexane-1,6-diol, cyclohexane-1,2- and -1,4-diol, hydrogenated bisphenol A (2,2-bis(4-hydroxycyclohexyl)propane), 2,2-dimethyl-3-hydroxypropyl 2,2-dimethyl-3-hydroxypropionate. Preference is given to butane-1,4-diol, cyclohexane-1,4-dimethanol and hexane- 1,6-diol. Examples of suitable triols are trimethylolethane, trimethylolpropane or glycerol, preference being given to trimethylolpropane.

The stated polyols can be used alone or in a mixture.

Both for the polyisocyanates (i) and for the NCO-containing polyurethane prepolymers (ii), as defined in claim 2, the NCO groups present may be modified entirely or partially with a (secondary) formamidosilane, to give a compound of the formula (II).

The compound of the formula (II) containing silane formamide groups has a number-average molecular weight $M_n$ of less than 10000 g/mol, preferably less than 6000 g/mol and more preferably less than 4000 g/mol.

The isocyanate groups of the polyisocyanates (i) or those of the polyurethane preopolymers (ii) are reacted according to the reaction equation below with the (secondary) formamidosilane:

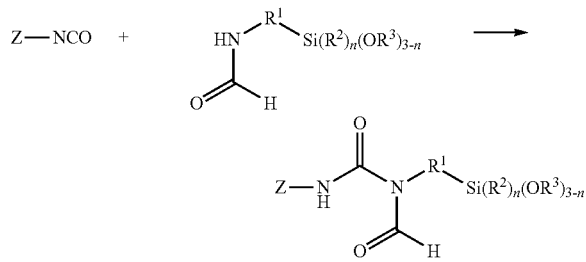

in which Z, $R^1$, $R^2$, $R^3$ and n are as defined above.

In the reaction of the (secondary) formamidosilane with isocyanate-containing prepolymers to form the polyurethane prepolymers (ii), as defined in claim 2, there are in principle two possible routes. First of all, an isocyanate-containing prepolymer can be prepared from a polyisocyanate and a polyol. The remaining isocyanates can be reacted in the last step with the (secondary) formamidosilane. Alternatively, the polyisocyanate can also be first reacted with the (secondary) formamidosilane, and the remaining isocyanates can be reacted with the hydroxyl groups of the polyol in the second step. The polyurethane prepolymer (ii) obtained can subsequently be purified, optionally by continuous distillation, such as thin-film distillation, for example.

Component C—Polyisocyanate

As a preferred further component, the coating material composition of the invention may comprise one or more silane-free aliphatic or cycloaliphatic polyisocyanates (C) having free or blocked isocyanate groups, of the kind commonly used in the coatings industry.

The polyisocyanate component (C) is a polyisocyanate having free or blocked isocyanate groups and having an acyclic, aliphatic polyisocyanate parent structure and/or a polyisocyanate parent structure derived from an acyclic aliphatic polyisocyanate of this kind by trimerization, dimerization, urethanization, biuretization, uretdionization and/or allophanatization.

The acyclic and/or aliphatic polyisocyanates serving as parent structures for the compounds (C) containing polyisocyanate groups are preferably substituted or unsubstituted aliphatic polyisocyanates that are known per se. Examples of preferred polyisocyanates are tetramethylene 1,4-diisocyanate, pentane 1,5-diisocyanate, hexamethylene 1,6-diisocyanate, 2,2,4-trimethylhexane 1,6-diisocyanate, ethylene diisocyanate, dodecane 1,12-diisocyanate, 3-isocyanatomethyl-3,5,5-trimethylcyclohexyl isocyanate (isophorone diisocyanate, IPDI), bis(4-isocyanatocyclohexyl)methane ($H_{12}$MDI) and mixtures of the aforesaid polyisocyanates. Additionally preferred polyisocyanate parent structures for component (C) are the polyisocyanates derived from an acyclic aliphatic polyisocyanate of this kind by trimerization, dimerization, urethanization, biuretization, uretdionization and/or allophanatization, more particularly the biuret dimer and/or the allophanate dimer and/or the isocyanurate trimer. In a further embodiment, the polyisocyanate parent structures for component (C) are polyisocyanate prepolymers having urethane structural units, which are obtained by reaction of polyols with a stoichiometric excess of aforesaid acyclic and/or aliphatic polyisocyanates. Polyisocyanate prepolymers of this kind are described for example in U.S. Pat. No. 4,598,131.

Particularly preferred polyisocyanate parent structures for component (C) are pentane 1,5-diisocyanate, hexamethylene diisocyanate and/or its biuret dimer and/or allophanate dimer and/or isocyanurate trimer and/or its uretdione, and also mixtures of the stated polyisocyanate parent structures.

Especially preferred polyisocyanate parent structures for component (C) are pentane 1,5-diisocyanate, hexamethylene diisocyanate and/or its isocyanurate trimer, optionally together with its uretdione.

Specific examples of such polyisocyanates are the polyisocyanate resins from the Desmodur® series from Bayer Material Science AG, Leverkusen, DE. It is possible with preference to make use, for example, of a low-viscosity, aliphatic polyisocyanate resin based on trimers of hexamethylene diisocyanate, such as Desmodur® N 3900 having an NCO functionality of 2.8 to 3.6 or Desmodur® N 3300 having an NCO functionality of 2.8 to 4.5. These polyisocyanates may optionally be used in a mixture with suitable solvents such as butyl acetate, as for example with 10% butyl acetate (Desmodur® N 3390), or solvent mixtures, as for example with 32% butyl acetate/solvent naphtha 100 (Desmodur® N 3368 BA/SN). All Desmodur® products are available from Bayer MaterialScience AG, Leverkusen, DE.

Component D—Catalyst

As a further essential component, the coating material composition of the invention comprises a catalyst (or "curing agent" or "activator"), which accelerates the hydrolysis and the condensation of the silanol groups of component (B). Catalysts of this kind are known to a skilled person. It is possible, for example, to use acids, such as, for example, sulfuric acid, p-toluenesulfonic acid, trifluoromethanesulfonic acid, acetic acid, trifluoroacetic acid and dibutyl phosphate, bases, such as N-substituted amidines such as 1,5-diazabicyclo[4.3.0]non-5-ene (DBN) and 1,5-diazabicyclo[5.4.0]undec-7-ene (DBU), but also metal salts and metal chelates, such as tetraisopropyl titanate, tetrabutyl titanate, titanium(IV) acetylacetonate, aluminum tri-sec-butylate, aluminum acetylacetonate, aluminum triflate or tin triflate, for example.

Likewise possible for use are catalysts based on aluminum oxide. One preferred catalyst for example is X-addm KR 9006 from Nano-X GmbH, Saarbrücken. Another preferred catalyst may be selected from the group consisting of tetraalkylammonium salts of organic acids, especially tetrabutylammonium benzoate.

These catalysts are employed in amounts of 0.02 up to 5 wt %, preferably up to 2 wt %, more preferably of 0.05 up to 1.5 wt %, based on the weight of the silane-modified formamides (B) employed. Depending on the nature and amount of the catalyst used, the coating material composition of the invention may be cured over a wide temperature range, for example from −20 to 200° C., preferably from 0 to 180° C., more preferably from 20 to 160° C. and very preferably 100-150° C. (in the case of automotive OEM finishing) or 20-60° C. (in the case of automotive refinishing). At high temperature, less catalyst can be used, whereas at low temperature more and/or more active catalysts are required.

Component E—Surface Additives

As a preferred further component, the coating material composition of the invention may comprise one or more surface additives. Such additives may serve in particular to improve the wettability of hydrophobic surfaces and as flow control agents. For the present intended application, siloxanes are preferably used. One particularly preferred surface additive (flow control agent) is a polyether-modified polydimethylsiloxane such as, for example, Byk® 331 from Byk-Chemie GmbH, Wesel, DE. Additionally it is possible to use products such as BYK® 306 or BYK® 141 from Byk GmbH, TegoGlide® 440 from Evonik Industries AG, Essen, DE, or Baysilone® OL 17 from OMG Borchers GmbH, Langenfeld, DE.

Component F—Solvents

As a further component, the coating material composition of the invention may comprise one or more solvents. They serve in particular for setting the viscosity of the coating material composition within the desired range. The solvents are generally organic, anhydrous solvents which are compatible with the other components of the coating material composition of the invention. Examples of such solvents are solvent napht-a (SN), 1-methoxyprop-2-yl acetate (MPA), butyl acetate (BA) and mixtures of these solvents.

Further Additives

Besides components (A) to (F) the coating material composition of the invention, depending on intended application and on specific chemical nature, may also comprise further components, examples being fillers, slip additives, water repellency agents, flame retardants, stabilizers, light stabilizers such as UV absorbers and sterically hindered amines (HALS), and also antioxidants, and also coatings auxiliaries, examples being antisettling agents, defoaming and/or wetting agents, flow control agents, reactive diluents, plasticizers, auxiliary solvents and/or thickeners and also pigments, dyes and/or matting agents. The use of light stabilizers and the various types are described by way of example in A. Valet, Lichtschutzmittel für Lacke, Vincentz Verlag, Hannover, 1996.

Suitable fillers by way of example include precipitated silicas and fumed silicas.

Preferred Embodiments According to the Invention

Described below in detail are preferred embodiments.

In one preferred embodiment, the STPs used in the coating material compositions of the invention have the general formula (II):

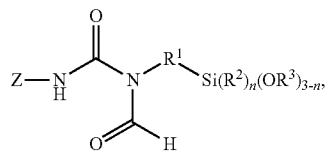

where in the formula (II):
Z is a molecule residue which consists of (i) a polyisocyanate or (ii) an NCO-containing polyurethane prepolymer, at least one NCO group of the stated structures in (i) or (ii) being modified, per molecule, with a secondary formamidosilane so that a compound of the formula (II) is formed;
$R^1$ is an at least divalent, optionally substituted, linear or branched, aliphatic and/or alicyclic structural unit having 1 to 12 carbon atoms, preferably 1-6 carbon atoms and more preferably 1-3 carbon atoms, it being possible for one or more nonadjacent methylene groups to be replaced in each case by O or S;
$R^2$ and $R^3$ in each case independently of one another are an optionally substituted, linear or branched, aliphatic and/or alicyclic group having 1 to 12, preferably 1, 2 or 3, carbon atoms; and
n is an integer from 0 to 2, more particularly 0.

Polyisocyanates (i)

In one particularly preferred embodiment, the structural unit Z is a radical which derives from a polyisocyanate. Suitable polyisocyanates used are the aliphatic or cycloaliphatic polyisocyanates that are known per se to the skilled person and have an NCO functionality of preferably ≥2. They may also have uretdione, methane, allophanate, isocyanurate, iminooxadiazinedione and/or biuret structures.

The abovementioned polyisocyanates are based on di- and/or triisocyanates known per se to the skilled person and having aliphatically and/or cycloaliphatically bonded isocyanate groups, it being immaterial whether they were produced using phosgene or by phosgene-free processes. Examples of such di- and/or triisocyanates are 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Bayer AG, Leverkusen, DE), 4-isocyanatomethyl octane 1,8-diisocyanate (triisocyanatononane, TIN), diisocyanato-1,3-dimethylcyclohexane (H6XDI), 1-isocyanato-1-methyl-3-isocyanatomethylcyclohexane, 1-isocyanato-1-methyl-4-isocyanatomethylcyclohexane, bis(isocyanatomethyl)norbornane, and also any desired mixtures of said compounds.

With particular preference the polyisocyanates here have an average NCO functionality of 2.0 to 5.0, very preferably of 2.3 to 4.5, and an isocyanate group content of preferably 5.0 to 50.0 wt %, more preferably of 5.0 to 30.0 wt %.

With particular preference the polyisocyanates of the aforementioned kind are based on pentane diisocyanate, hexamethylene diisocyanate, isophorone diisocyanate, the isomeric bis-(4,4'-isocyanatocyclohexyl)methanes, mixtures thereof, and also uretdione dimers, isocyanurate trimers and iminooxadiazinedione trimers of these polyisocyanates.

The silane-modified compounds of formula (II), where Z derives from a polyisocyanate (i), may advantageously be prepared by the following two-stage process:

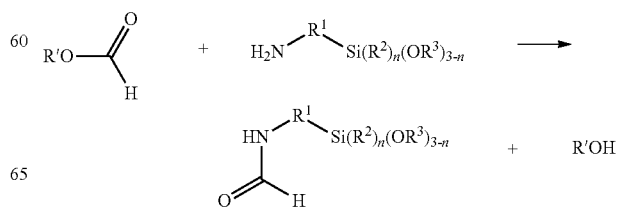

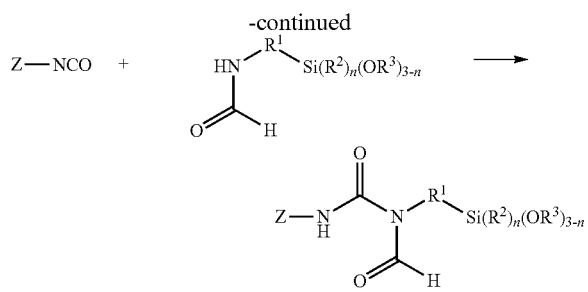

First of all, preferably, an excess of the alkyl formate R'O—CHO is added dropwise to the amine $H_2N$—$R^1$—Si$(R_2)_n(OR_3)_{3-n}$, where R' is preferably an alkyl group having 1 to 4 carbon atoms and $R^1$, $R^2$, $R^3$ and n are as defined above. Particularly preferred as alkyl formate R'O—CHO is methyl formate or ethyl formate. Preferably 1 mol of amine is reacted with an excess of 1.01 to 6 mol of alkyl formate R'O—CHO, more preferably 1.05 to 4 mol, at the boiling temperature of ethyl formate. After the end of reaction, the excess alkyl formate R'O—CHO and the resultant alcohol R'—OH are distilled off by thin-film distillation, and the resultant (secondary) formamidosilane OHC—HN—R'—Si$(R_2)_n(OR_3)_{3-n}$ is optionally isolated by filtration.

The (secondary) formamidosilane is subsequently reacted with a polyisocyanate of the formula Z—NCO, preferably under inert conditions, at temperatures of 20 to 200° C., preferably 40 to 160° C. The two components here are used in an equivalent ratio of isocyanate groups to formamide groups of at least 1:10 to at most 40:1, preferably of 1:5 to at most 30:1, and very preferably of 1:2 to at most 25:1. The reaction may be performed in solution or solventlessly in bulk. Depending on the stoichiometry of the reaction, the (tertiary) product of the formula (II), containing formamidosilane groups, may still contain free isocyanate groups.

The preparation of the compounds with the formula (II), where Z is an (i) polyisocyanate, can be carried out without the use of catalysts. Optionally it is also possible, however, to add known catalysts in order to accelerate the reaction. Examples include tertiary amines, for example triethylamine, tributylamine, dicyclohexylmethylamine, dimethylcyclohexylamine, N,N,N',N'-tetramethyldiaminodiethyl ether, bis(dimethylaminopropyl)urea, N-methyl- or N-ethylmorpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,2-dimethylimidazole, 2-methylimidazole, N,N-dimethylimidazole-β-phenylethylamine, 1,4-diazabicyclo[2.2.2]octane (DABCO) and bis(N,N-dimethylaminoethyl) adipate, amidines, for example 1,5-diazabicyclo[4.3.0]non-ene (DBN), 1,8-diazabicyclo[5.4.0]undec-7-ene (DBU) and 2,3-dimethyl-3,4,5,6-tetrahydropyrimidine, alkanolamine compounds, for example triethanolamine, triisopropanolamine, N-methyldiethanolamine, N-ethyldiethanolamine, dimethylaminoethanol and 2-(N,N-dimethylaminoethoxy)ethanol, N,N',N''-tris(dialkylaminoalkyl)hexahydrotriazines, for example N,N',N''-tris(dimethylaminopropyl)-s-hexahydrotriazine, bis(dimethylaminoethyl) ether and metal salts, for example inorganic and/or organic compounds of iron, lead, bismuth, zinc and/or tin in customary oxidation states of the metal, for example iron(II) chloride, iron(III) chloride, bismuth(III) bismuth(III) 2-ethylhexanoate, bismuth(III) octoate, bismuth(III) neodecanoate, zinc chloride, zinc 2-ethylcaproate, zinc(II) trifluoromethanesulfonate (zinc triflate), tin(II) octoate, tin(II) ethylcaproate, tin(II) palmitate, dibutyltin(IV) dilaurate (DBTL), dibutyltin(IV) dichloride or lead octoate.

Preferred catalysts for use are tertiary amines, amidines and tin compounds and/or zinc compounds of the type stated. Particularly preferred catalysts are 1,4-diazabicyclo[2.2.2]octane (DABCO), 1,5-diazabicyclo[4.3.0]nonene (DBN), 1,8-diazabicyclo[5.4.0]undec-7-ene (DBU), and also dibutyl tin(IV) dilaurate (DBTL) and zinc(II) trifluoromethane sulfonate (zinc triflate).

The catalysts stated by way of example above can be used individually or in the form of any desired mixtures in the reaction, and are employed, if at all, in amounts of 0.001 to 1.0 wt/%, preferably 0.01 to 0.5 wt %, calculated as the total amount of catalysts used, based on the total amount of the starting compounds used.

The progress of the reaction can be monitored by determining the NCO content by titrimetric means, for example. When the desired NCO content has been reached, the reaction is terminated.

The silane-modified compounds of the formula (II) thus prepared, where Z derives from a polyisocyanate (i), constitute clear, virtually colorless products which, depending on the starting materials selected, are liquids of low to high viscosity and have residual levels of monomeric starting diisocyanates of less than 1.0 wt %, preferably of less than 0.5 wt %, more preferably of less than 0.3 wt %, based on the overall mass of the reaction product.

Any residues of NCO that are still detectable can be scavenged by adding methanol.

In order to prevent premature crosslinking of the silane groups of the compounds of the formula (II) during the preparation process of the invention, the addition of water scavengers may be advantageous. For example, it is possible to use orthoformic esters, such as triethyl orthoformate, vinylsilanes, such as vinyltrimethoxysilane, or organic phosphates, such as dibutyl phosphate, for example. The water scavengers are employed, if necessary, in amounts of up to 5 wt %, preferably up to 2 wt %, based on the total amount of the starting materials.

If catalysts and/or water scavengers are used, they may be added to the starting compounds even before the start of the actual reaction. However, it is also possible to add these auxiliaries to the reaction mixture at any time during the reaction.

In one preferred embodiment, the process described here takes place under an inert gas atmosphere, such as nitrogen, for example.

NCO-Containing Polyurethane Prepolymer (ii)

In a further embodiment, the structural unit Y is a radical which derives from a prepolymer carrying isocyanate groups. This may in particular be a polyurethane prepolymer. The preparation of the isocyanate-group-carrying polyurethane prepolymer Y—NCO in accordance with the invention entails the reaction of one or more aforementioned polyisocyanates with one or more polyols.

The silane-modified compounds of the formula (II) according to the invention, where Z derives from an NCO-containing polyurethane prepolymer (ii), are prepared in principle in a manner known from polyurethane chemistry. In this case the polyols (individually or as a mixture) are reacted with an excess of the polyisocyanate (individually or as a mixture), optionally in the presence of a catalyst and/or of auxiliaries and adjuvants. The homogeneous reaction mixture is stirred until a constant NCO value is obtained. Then the unreacted polyisocyanate can optionally be removed by continuous distillation. In the examples according to the invention, a prepolymer is described which is used further without further removal of monomeric polyisocyanates.

A continuous distillation process here is understood to be a process in which only a respective part-amount of the prepolymer from the above-described process step is exposed briefly to an elevated temperature, while the quantity not yet part of the distillation procedure remains at a significantly lower temperature. Increased temperature in this case means the temperature which is necessary to evaporate the volatile constituents at an appropriately selected pressure.

The distillation is conducted preferably at a temperature of less than 170° C., more preferably 110 to 170° C., very preferably 125 to 145° C., and at pressures of less than 20 mbar, more preferably less than 10 mbar, very preferably at 0.05 to 5 mbar.

The temperature of the quantity of prepolymer-containing reaction mixture that is not yet within the distillation procedure is preferably 00 to 60° C., more preferably 15° to 40° C. and very preferably 20° to 40° C.

The temperature difference between the distillation temperature and the temperature of that quantity of the prepolymer-containing reaction mixture that is not yet within the distillation procedure is preferably at least 5° C., more preferably at least 15° C., very preferably 15° to 40° C.

The distillation is preferably conducted at a rate such that one volume increment of the prepolymer-containing reaction mixture for distillation is exposed to the distillation temperature for less than 10 minutes, more preferably less than 5 minutes, and subsequently, by active cooling if desired, the temperature is brought to the original temperature of the prepolymer-containing reaction mixture prior to the distillation. The temperature load traversed in this case is preferably such that the temperature of the reaction mixture before the distillation or of the prepolymer after the distillation is higher than the distillation temperature employed by at least 5° C., more preferably at least 15° C., very preferably at least 15° to 40° C.

Preferred continuous distillation techniques are short-path, falling-film and/or thin-film distillation (in this regard see, for example, Chemische Technik, Wiley-VCH, Volume 1, 5th edition, pages 333-334).

A preferred continuous distillation technique employed is thin-film distillation with the parameters stated above.

The process for preparing the NCO-containing polyurethane prepolymer may be carried out without catalysis. The urethanization reaction can optionally also be accelerated using catalysts customary in isocyanate chemistry. Suitable catalysts have already been described above in relation to the preparation.

Particularly preferred catalysts are 1,4-diazabicyclo[2.2.2]octane (DABCO), 1,5-diazabicyclo[4.3.0]nonene (DBN), 1,8-diazabicyclo[5.4.0]undecene-7 (DBU) and dibutyltin(IV) dilaurate (DBTL).

The NCO-containing polyurethane prepolymer thus obtained can then be reacted, in a second step, with the above-described (secondary) formamidosilane OHC—HN—$R^1$—Si($R^2$)$_n$(OR$^3$)$_{3-n}$; here, reference is made to the above-described process for preparing the formamidosilane-modified polyisocyanates.

In an alternative regime, it is also possible for the (secondary) formamidosilane OHC—HN—R'—Si($R^2$)$_n$(OR$^3$)$_{3-n}$ to be reacted first with a polyisocyanate, with only a fraction of the isocyanate groups being reacted. The remaining isocyanates are then reacted in a second step with the above-described polyols, in a urethanization reaction. The reaction takes place at temperatures of 20° to 200° C., preferably 40° to 160° C. The equivalent ratio of isocyanate groups to hydroxyl groups observed in this reaction is a ratio of 0.7:1 to 1.2:1, preferably of 0.8:1 to 1.1:1, more preferably of 0.9:1 to 1.05:1.

Preferred Substituent Definitions in Formula (I) and Formula (II)

The following substituent definitions are preferred in the formula (I) and, respectively, in the formula (II): $R^1$ is methylene (—CH$_2$—), ethylene or propylene (especially n-propylene, i.e. —CH$_2$CH$_2$CH$_2$—); $R^2$ and $R^3$ in each case independently of one another are -methyl or -ethyl, preferably -methyl, and n is an integer from 0 to 2, with n preferably being zero.

The following substituent definitions are particularly preferred in the formula (I) and, respectively, in the formula (II): $R^1$ is n-propylene; $R^2$ and $R^3$ in each case independently of one another are -methyl or -ethyl; and n is an integer from 0 to 2.

Application and Substrates

The coating material compositions of the invention are of course used for the coating of substrates. More particularly they are employed in motor vehicle finishing, and preferably in automotive OEM finishing.

Normally, 2-component coating materials are produced, which are mixed immediately prior to painting. The intention thereby in particular is to prevent the possibility of the silane reacting with OH groups to begin with, leading to hydrolysis.

Automotive OEM finishing takes place customarily at room temperature, followed by a baking operation in the high-temperature range (120° to 140° C.). The coating material composition of the invention is applied preferably by electrostatic spray application: In this method, both the bodywork and the paint to be applied are electrostatically charged. Application in the automobile plant again takes place customarily by means of robots with high-speed rotating bells, which generate extremely small droplets, which then flow out as paint.

However, it is also possible to use coating material compositions of the invention for refinishing. This is done typically by gravity-fed cup application with directed air, and subsequent low-temperature drying (room temperature up to 60° C. over a period of 1 to 3 h). A requirement for this is a more reactive coating material composition, the reactivity being able to be increased for example by means of more catalyst and more active catalysts, and by the use of silanol-protecting groups (especially methoxy groups) which can be hydrolyzed rapidly.

The coating materials of the invention can be applied, furthermore, by the customary techniques to any of a wide variety of different substrates, such as, for example, by spraying, rolling, knife coating, pouring, squirting, brushing, impregnating, dipping, or by printing techniques such as screen, gravure, flexographic or offset printing, and also by transfer methods. Examples of suitable substrates are wood, metal, particularly including metal as used in the applications known as wire, coil, can or container coating, and additionally plastic, including in the form of films, particularly ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviated designations according to DIN 7728T1), and/or blocks and blends of these plastics, paper, leather, textiles, felt, glass, wood, wood-based materials, cork, inorganically bonded substrates such as wood boards and fiber cement boards, electronic assemblies, or mineral substrates. Heat-sensitive substrates cannot be treated at high temperatures and therefore require curing in the low-temperature range (room temperature up to about 50° C. or 80° C.) and, consequently, a coating material composition with corresponding reactivity.

Substrates consisting of various of the aforementioned materials, or substrates which have already been coated, can also be painted or finished. It is also possible to apply the coating materials to a substrate only temporarily, then to cure them partly or completely and redetach them, in order to produce films, for example. The coating materials of the invention are especially suitable for use in the finishing of vehicles, particularly automobile bodies or ancillary components, preferably in the form of clearcoat materials.

The applied film thicknesses (before curing) are typically between 0.5 and 5000 µm, preferably between 5 and 1500 µm, more preferably between 15 and 1000 µm.

Suitable metal substrates may in general be fabricated from all metals and metal alloys that are customary in the field. Employed with preference are metals, such as aluminum, stainless steel, steel, titanium, ferrous metals, and alloys, for example, of the kind customary particularly in automobile construction.

The substrates are in turn typically precoated, specifically, normally, first with an electro-coat material, a primer-surfacer (water-based or solvent-based—though there are also surface-free systems), and with a basecoat material. If the coating material of the invention is a pigmented topcoat material, the application of basecoat may be omitted. Optionally it may also be necessary or at least useful to pretreat the surfaces of the target substrates with a physical, chemical and/or physico-chemical method, such as by phosphating or (in the case of refinishing) by sanding.

Furthermore, the target substrates may possess a desired shape which is necessary for the particular application. This means that any three-dimensional substrates may be finished with the nonaqueous coating material composition of the invention—in particular and preferably, automobile bodies or parts thereof.

EXPERIMENTAL SECTION

The examples which follow serve to illustrate the present invention, but should in no way be understood as imposing any restriction on the scope of protection.

All reported percentages are based on weight unless otherwise stated.

The NCO contents were determined by titrimetry as per DIN EN ISO 11909.

OH numbers were determined by titrimetry to DIN 53240-2: 2007-11, acid numbers to DIN 3682 5. The OH contents reported were calculated from the OH numbers determined by analysis.

The residual monomer contents were measured to DIN EN ISO 10283 by gas chromatography with an internal standard.

Molecular weights were determined by gel permeation chromatography as per DIN 55672-1 (Gel permeation chromatography (GPC)—Part 1: tetrahydrofuran (THF) as eluent) against polystyrene standards, with the modification that a flow rate of 0.6 ml/min rather than 1.0 ml/min was used.

All the viscosity measurements were made with a Physica MCR 51 rheometer from Anton Paar Germany GmbH (Germany) to DIN EN ISO 3219.

Scratching: The scratching was tested on a complete system. For this purpose, prior to application of the clearcoat, the plate material was coated with a one-component water-based OEM primer-surfacer and with a one-component OEM water-based basecoat material. The primer-surfacer was baked at 165° C. for 20 minutes, and the basecoat was flashed off or predried at 80° C. for 10 minutes. Then the clearcoat material was applied and was baked at 140° C. for 30 minutes.

Pendulum damping: Pendulum damping was measured according to DIN EN ISO 1522 on a glass plate and is determined according to König.

Solvent resistance: For this purpose, a small amount of the relevant solvents (xylene, 1-methoxyprop-2-yl acetate, ethyl acetate or acetone) was placed into a test tube and a cotton pad was placed at the opening, so that an atmosphere saturated with solvent developed within the test tube. The test tubes were subsequently brought with the cotton pad onto the surface of the coating, where they remained for 5 minutes. After the solvent had been wiped off, the film was examined for destruction/softening/loss of adhesion (0=no change, 5=film destroyed).

Wet scratch resistance: The wet scratch resistance was tested by means of a laboratory washing unit according to DIN EN ISO 20566. The figure reported is the loss of gloss in Gloss Units (GU) after scratching (10 cycles). The gloss was measured by reflectometry. The lower the loss of gloss in GU, the more resistant the coating is toward wet scratching.

Dry scratch resistance: The flat side of a hammer (weight 800 g) was covered with steel wool or polishing paper. The hammer was applied carefully at right angles to the coating and, without tipping and without additional physical force, was guided in a track uniformly over the coating. 10 back-and-forth strokes were performed. The residual gloss was measured at 3 different places transverse to the direction of scratching. The gloss was measured by reflectometry. The lower the loss of gloss in GU, the more resistant the coating is toward wet scratching.

SYNTHESIS EXAMPLES

Synthesis of Secondary Formamidosilanes as Precursor Compounds

Synthesis Example 1:
N-(3-Trimethoxysilylpropyl)formamide

A flask with thermometer, KPG stirrer, reflux condenser and dropping funnel is charged under a nitrogen atmosphere and at room temperature with 1075.8 g (6 mol) of 3-aminopropyltrimethoxysilane. With stirring, 378.6 g (6.3 mol) of methyl formate are added dropwise at a rate such that 50° C. is not exceeded. After the exothermic heat has subsided, stirring is continued at room temperature for 4 hours and then the excess methyl formate and the resultant methyl alcohol are distilled off under reduced pressure (0.1 mbar at 50° C.). This gives a colorless liquid having a viscosity of 11 mPa's at 23° C.

Synthesis Example 2:
N-(3-Methyldimethoxysilylpropyl)formamide

A flask with thermometer, KPG stirrer, reflux condenser and dropping funnel is charged under a nitrogen atmosphere and at room temperature with 99.6 g (0.6 mol) of 3-aminopropylmethyldimethoxysilane. With stirring, 40.3 g (0.67 mol) of methyl formate are added dropwise at a rate such that 50° C. is not exceeded. After the exothermic heat has subsided, stirring is continued at room temperature for 4 hours and then the excess methyl formate and the resultant methyl alcohol are distilled off under reduced pressure (0.1 mbar at 50° C.). This gives a colorless liquid.

Synthesis Example 3:
N-(3-Triethoxysilylpropyl)formamide

A flask with thermometer, KPG stirrer, reflux condenser and dropping funnel is charged under a nitrogen atmosphere and at room temperature with 221.4 g (1 mol) of 3-aminopropyltriethoxysilane. With stirring, 77.8 g (1.05 mol) of ethyl formate are added dropwise at a rate such that 50° C. is not exceeded. After the exothermic heat has subsided, stirring is continued at room temperature for 4 hours and then the excess ethyl formate and the resultant ethyl alcohol are distilled off under reduced pressure (0.1 mbar at 80° C.). This gives a colorless liquid having a viscosity of 13 mPa's at 23° C.

Synthesis Example 4:
N-(3-Methyldiethoxysilylpropyl)formamide

A flask with thermometer, KPG stirrer, reflux condenser and dropping funnel is charged under a nitrogen atmosphere and at room temperature with 497.9 g (2.6 mol) of 3-aminopropylmethyldiethoxysilane. With stirring, 212.1 g (2.8 mol) of ethyl formate are added dropwise at a rate such that 50° C. is not exceeded. After the exothermic heat has subsided, stirring is continued at room temperature for 4 hours and then the excess ethyl formate and the resultant ethyl alcohol are distilled off under reduced pressure (0.1 mbar at 80° C.). This gives a colorless liquid having a viscosity of 12 mPas at 23° C.

Synthesis of the Silane-Modified Compounds, Containing at Least One Tertiary Formamidosilane Group, of the General Formula (I) or (II)

Synthesis Example 5—NCO-Free STP of Formula (II)

A flask with thermometer, KPG stirrer, reflux condenser and dropping funnel was charged under a nitrogen atmosphere with 201.6 g (1.2 mol) of hexamethylene diisocyanate (HDI) and this initial charge was heated to 65° C. 54 mg of zinc trifluoromethanesulfonate were added, and 248.8 g of N-(3-trimethoxysilylpropyl)formamide (1.2 mol, prepared as per synthesis example 1-) were added dropwise at 65° C. over the course of 75 minutes. Stirring took place at 65° C. for a total of 12.5 hours, with the further addition of 54 mg of zinc trifluoromethanesulfonate after a stirring time of 8 hours. After the end of the stirring time indicated, the concentration of the free isocyanate groups was 11.1% (theoretically 11.2%). The reaction mixture was heated to 85° C., and 87.6 g (0.6 mol) of 2,2,4-trimethylpentane-1,3-diol were added at this temperature over the course of 1 hour. After a stirring time of 3 h at 85° C., the reaction mixture was admixed with 230.0 g of MPA, to lower the viscosity of the reaction mixture. After a further 5.5 h of subsequent stirring, the reaction was at an end, since according to IR it was no longer possible to detect any free NCO groups. This gives a clear liquid having a polymer content of 69% and a viscosity of 297 mPas at 23° C.

The amount of elemental Si in this formulation is 4.4 wt % and is a measure of the amount of crosslinkable trimethoxysilane groups contained.

Synthesis Example 6—NCO-Containing STP of Formula (II)

In this synthesis example, the NCO groups of Desmodur® N 3900 were partially reacted with a formamidosilane. The resulting STP contains both NCO groups and silane groups and acts as a hybrid system, meaning that it is able to crosslink not only via its NCO groups but also via its silane groups:

A flask with thermometer, KPG stirrer, reflux condenser and dropping funnel was charged under a nitrogen atmosphere with 536.2 g of Desmodur® N 3900 and 91 mg of zinc trifluoromethanesulfonate and its initial charge was heated to 100° C. At this temperature, over the course of 1 h, 373.1 g of N-(3-trimethoxysilylpropyl)formamide (1.8 mol, prepared as per synthesis example 1) were added dropwise. Stirring was continued at 100° C. for a further 3 hours until the free NCO group content had dropped to 4.8%. The batch was admixed with 114 g of butyl acetate and 114 g of solvent naphtha 100 and cooled to room temperature.

This gave a clear liquid having a polymer content of 80% and a viscosity of 1030 mPas.

The amount of elemental Si in this formulation is 4.4 wt % and is a measure of the amount of crosslinkable trimethoxysilane groups contained.

Synthesis Example 7: Comparative Example to Synthesis Example 5—not Inventive

NCO-Free STP of Formula (II): Use of 1-Mercaptopropyl-3-Trimethoxysilane Instead of the (Secondary) Formamidosilane of the Invention from Synthesis Example 1

A flask with thermometer, KPG stirrer, reflux condenser and dropping funnel was charged under a nitrogen atmosphere with 604.8 g of hexamethylene diisocyanate (3.6 mol) and this initial charge was heated to 85° C. At this temperature, over the course of 1 h, 262.8 g of 2,2,4-trimethyl-1,3-pentanediol/1.8 mol) were added in portions until the reaction mixture had an isocyanate group content of 17.1 wt %. The reaction mixture was diluted with 230.0 g of 1-methoxy-2-propyl acetate (MPA) and adjusted to 55° C. First of all, at this temperature, 160 mg of 1,4-diazabicyclo[2.2.2]octane (DABCO) were added to the reaction mixture; thereafter, at a temperature of 50°–55° C., 759.9 g of 3-mercaptopropyltrimethoxysilane (95%, 3.68 mol) were added to the reaction mixture. Stirring was continued at 50° C. for 4.5 hours until according to IR spectroscopy the isocyanate group content had dropped to zero. The batch was diluted with a further 460 g of MPA. This gave a material having a polymer content of 68 wt % and a viscosity of 364 mPas at 23° C.

The amount of elemental Si in this formulation is 4.4 wt % and is a measure of the amount of crosslinkable trimethoxysilane groups contained.

Synthesis Example 8: Comparative Example to Synthesis Example 6—not Inventive

NCO-Containing STP of the Formula (II): Use of 1-Mercaptopropyl-3-Trimethoxysilane Instead of the (Secondary) Formamidosilane of the Invention from Synthesis Example 1

In this synthesis example, the NCO groups of Desmodur® N 3900 were partially reacted with a mercaptosilane. The resulting STP contains both NCO groups and silane groups and acts as a hybrid system, meaning that it is able to crosslink not only via its NCO groups but also via its silane groups:

A flask with thermometer, KPG stirrer, reflux condenser and dropping funnel was charged under a nitrogen atmosphere with 536.2 g of Desmodur® N 3900 and 90 mg of 1,4-diazabicyclo[2.2.2]octane (DABCO) and its initial charge was heated to 82° C. At this temperature, over the course of 1 h, 371.0 g of 3-mercaptopropyltrimethoxysilane (95%, 1.80 mol) were added dropwise. After this dropwise addition time, the batch was stirred further at 82° C. for 3 hours more until the NCO group content had dropped to 5.1 wt %. At a temperature of 82° C., subsequently, 114 g of butyl acetate and 114 g of solvent naphtha were added and the batch was cooled to room temperature. This gave a silanized polyisocyanate having a polymer content of 80 wt % and a viscosity of 518 mPas at 23° C.

The amount of elemental Si in this formulation is 4.4 wt % and is a measure of the amount of crosslinkable trimethoxysilane groups contained.

Working Examples and Comparative Examples

Working Example and Comparative Example 1

The STP of the formula (II) prepared in synthesis example 5 was formulated as follows to a coating material composition of the invention and was compared with a formamidosilane-free composition having the same degree of crosslinking and the same proportion of resin solids. Since the comparative formulation contains no silane groups, the catalyst (D) was omitted as well.

| | Working Example 1 | Comparative Example 1 |
|---|---|---|
| Component (A) - polyol | Setalux ® 1774 SS-65 | |
| Component (B) - STP | Synthesis Example 5 | — |
| Component (C) - Polyisocyanate | Desmodur ® N 3390 BA | |
| Component (D) - Catalyst | X-add ® KR 9006 | — |
| Component (E) - Flow control agent | Byk ®331 | |
| Component (F) - Solvent | MPA/SN 100 | |
| Quantitative formulation | | |
| Setalux ® 1774 SS-65, as-supplied form (asf.) | 56.23 g | 56.23 g |
| Synthesis Example 5 | 93.76 g | — |
| Desmodur ® N 3390 BA, asf. | 23.39 g | 23.39 g |
| Byk ® 331, 10% in BA | 1.22 g | 0.58 g |
| X-add ® KR 9006, asf. | 1.83 g | — |
| MPA/SN 100 (1:1) | 27.50 g | 19.80 g |
| Sum total: | 203.93 g | 100.00 g |

The present test formulas are calculated so that the polyol (A) and the polyisocyanate (C) are crosslinked equimolarly, since the STP of synthesis example 5 no longer has any free isocyanate groups.

The amount of flow control agent (E) added was selected so that the fraction of flow control agent present is the same, based on the resin solids fraction (solids content) of the overall formulation.

For example, Desmodur® N 3390 is supplied as a 90% solution in butyl acetate (BA).

The coating materials were produced by mixing the binders with the remaining components and stirring the mixture at room temperature. The spray viscosity was set using a 1:1 mixture of 1-methoxyprop-2-yl acetate/solvent naphtha 100. The quantities of solvent were selected such that the spray viscosities of working example 1 and comparative example 1 were the same. The spray viscosity set relates to the flow time from the ISO cup, 5 mm nozzle (DIN EN ISO 2431), and is 30 seconds in this and all further experiments.

In order to examine relevant performance properties, the formulations of working example 1 and comparative example 1 were tested alongside one another by the same procedure (application example from automotive OEM finishing).

The table below shows the results of the comparative performance testing:

| | | Working Example 1 | Comparative Example 1 |
|---|---|---|---|
| Pendulum damping | after 1 h 23° C. | 188 s | 193 s |
| | after 24 h 23° C. | 186 s | 212 s |
| | after 16 h 60° C. | 190 s | 212 s |
| Solvent resistance 5 min. Xylene | after 1 h 23° C. | 0 | 2 |
| | after 24 h 23° C. | 0 | 1 |
| | after 16 h 60° C. | 0 | 1 |
| Solvent resistance 5 min. 1-Methoxyprop-2-yl acetate | after 1 h 23° C. | 1 | 2 |
| | after 24 h 23° C. | 1 | 1 |
| | after 16 h 60° C. | 0 | 0 |
| Solvent resistance 5 min. Ethyl acetate | after 1 h 23° C. | 4 | 4 |
| | after 24 h 23° C. | 2 | 4 |
| | after 16 h 60° C. | 1 | 2 |
| Solvent resistance 5 min. Acetone | after 1 h 23° C. | 4 | 4 |
| | after 24 h 23° C. | 4 | 4 |
| | after 16 h 60° C. | 4 | 4 |
| Wet scratch resistance Loss of gloss after 10 cycles | after 1 h 23° C. | 13 GU* | 27 GU |
| | after 24 h 23° C. | 15 GU | 33 GU |
| | after 16 h 60° C. | 14 GU | 33 GU |
| Dry scratch resistance with polishing paper, loss of gloss | after 1 h 23° C. | 29 GU | 61 GU |
| | after 24 h 23° C. | 56 GU | 54 GU |
| | after 16 h 60° C. | 47 GU | 53 GU |
| Dry scratch resistance with steel wool, loss of gloss | after 1 h 23° C. | 27 GU | 55 GU |
| | after 24 h 23° C. | 28 GU | 50 GU |
| | after 16 h 60° C. | 31 GU | 50 GU |

*GU = Gloss Units

Working Example 2 and Comparative Example 2

The STP of the formula (II) prepared in synthesis example 6 was formulated as follows to a coating material composition of the invention and, as in working example 1 and comparative example 1, was compared with a composition without tertiary formamidosilane groups, having the same degree of crosslinking and the same resin solids fraction:

| | Working Example 2 | Comparative Example 2 |
|---|---|---|
| Component (A) - Polyol | Setalux ® 1774 SS-65 | |
| Component (B) - STP | Synthesis Example 6 | — |

-continued

|  | Working Example 2 | Comparative Example 2 |
|---|---|---|
| Component (C) - Polyisocyanate | — | Desmodur ® N 3390 BA |
| Component (D) - Catalyst | X-add ® KR 9006 | — |
| Component (E) - Flow control agent | Byk ® 331 | |
| Component (F) - Solvent | MPA/SN 100 | |
| Quantitative formulation | | |
| Setaiux ® 1774 SS-65, asf. | 56.23 g | 56.23 g |
| Synthesis Example 6 | 127.34 g | — |
| Desmodur ® N 3390 BA, asf. | — | 23.39 g |
| Byk ® 331, 10% in BA | 1.38 g | 0.58 g |
| X-add ® KR 9006, asf. | 2.08 g | — |
| MPA/SN 100 (1:1) | 44.00 g | 19.80 g |
| Sum total: | 231.03 g | 100.00 g |

The present test formulas were calculated such that the polyol (A) and the STP (B) and/or the polyisocyanate (C) are crosslinked equimolarly.

In analogy to working example 1 and comparative example 1, again, paint samples were produced and were compared with one another by the methods indicated there. The result is shown by the following table.

|  |  | Working Example 2 | Comparative Example 2 |
|---|---|---|---|
| Pendulum damping | after 1 h 23° C. | 158 s | 193 s |
|  | after 24 h 23° C. | 174 s | 212 s |
|  | after 16 h 60° C. | 200 s | 212 s |
| Solvent resistance 5 min, Xylene | after 1 h 21° C. | 0 | 2 |
|  | after 24 h 23° C. | 0 | 1 |
|  | after 16 h 60° C. | 0 | 1 |
| Solvent resistance 5 min. 1-Methoxyprop-2-yl acetate | after 1 h 23° C. | 0 | 2 |
|  | after 24 h 23° C. | 0 | 1 |
|  | after 16 h 60° C. | 0 | 0 |
| Solvent resistance 5 min. Ethyl acetate | after 1 h 23° C. | 1 | 4 |
|  | after 24 h 23° C. | 1 | 4 |
|  | after 16 h 60° C. | 0 | 2 |
| Solvent resistance 5 min. Acetone | after 1 h 23° C. | 4 | 4 |
|  | after 24 h 23° C. | 2 | 4 |
|  | after 16 h 60° C. | 2 | 4 |
| Wet scratch resistance Loss of gloss after 10 cycles | after 1 h 23° C. | 10 GU | 27 GU |
|  | after 24 h 23° C. | 12 GU | 33 GU |
|  | after 16 h 60° C. | 12 GU | 33 GU |
| Dry scratch resistance with polishing paper, loss of gloss | after 1 h 23° C. | 14 GU | 61 GU |
|  | after 24 h 23° C. | 22 GU | 54 GU |
|  | after 16 h 60° C. | 19 GU | 53 GU |
| Dry scratch resistance with steel wool, loss of gloss | after 1 h 23° C. | 18 GU | 55 GU |
|  | after 24 h 23° C. | 16 GU | 50 GU |
|  | after 16 h 60° C. | 17 GU | 50 GU |

From the tables above it is seen that, relative to the comparative examples, which contained no formamidosilane-modified compounds of the formula (II), the substrates coated with coating materials of the invention, containing tertiary formamidosilane groups, exhibit significantly improved resistance toward various solvents and also an improved scratch resistance (dry and wet).

Working Example 3 and Comparative Example 3

The STP of the formula (II) prepared in synthesis example 5 was formulated as follows into a coating material composition of the invention and was compared with a formulation containing the STP from synthesis example 7. The formulation corresponds to application example 1 and to comparative example 1. The STP of synthesis example 7 (comparative example) is comparable structurally to the inventive STP of synthesis example 5, except that the silane groups were introduced not via the secondary formamidosilanes described above, but instead through a 3-mercaptopropyltrimethoxysilane. Both formulations contain the same amount of crosslinkable silane groups (see figures for the silane content in synthesis examples 5 and 7). The performance results obtained allow a comparison to be made of the effect of STPs based on the inventive formamidosilane building blocks relative to a silane building block of the prior art.

|  | Working Example 3 | Comparative Example 3 |
|---|---|---|
| Component (A) - Polyol | Setalux ® 1774 SS-65 | |
| Component (B) - STP | Synthesis Example 5 | Synthesis Example 7 |
| Component (C) - Polyisocyanate | Desmodur ® N 3390 BA | |
| Component (D) - Catalyst | X-add ® KR 9006 | X-add ® KR 9006 |
| Component (E) - Flow control agent | Byk ®331 | |
| Component (F) - Solvents | MPA/SN 100 | |
| Quantitative formulation | | |
| Setalux 1774 SS-65, asf. | 56.23 g | 56.23 g |
| Synthesis Example 5 | 93.76 g | — |
| Synthesis Example 7 | — | 95.14 g |
| Desmodur ® N 3390 BA, asf. | 23.39 g | 23.39 g |
| Byk ® 331, 10% in BA | 1.22 g | 1.22 g |
| X-add ® KR 9006, asf. | 1.83 g | 1.83 g |
| MPA/SN 100 (1:1) | 27.50 g | 29.48 g |
| Sum total: | 203.93 g | 207.29 g |

The present test formulas are calculated such that the polyol (A) and the polyisocyanate (C) are crosslinked equimolarly, because the STPs of synthesis examples 5 and 7 no longer have any free isocyanate groups. The procedure is otherwise as described in working example 1 and comparative example 1.

In analogy to working example 1 and comparative example 1, again, paint samples were produced and were compared with one another by the methods indicated there. The result is shown by the following table.

|  |  | Working Example 3 | Comparative Example 3 |
|---|---|---|---|
| Pendulum damping | after 1 h 23° C. | 188 s | 162 s |
|  | after 24 h 23° C. | 186 s | 172 s |
|  | after 16 h 60° C. | 190 s | 205 s |
| Solvent resistance 5 min. Xylene | after 1 h 23° C. | 0 | 1 |
|  | after 24 h 23° C. | 0 | 1 |
|  | after 16 h 60° C. | 0 | 0 |
| Solvent resistance 5 min. 1-Methoxyprop-2-yl acetate | after 1 h 23° C. | 1 | 1 |
|  | after 24 h 23° C. | 1 | 1 |
|  | after 16 h 60° C. | 0 | 0 |
| Solvent resistance 5 min. Ethyl acetate | after 1 h 23° C. | 4 | 4 |
|  | after 24 h 23° C. | 2 | 2 |
|  | after 16 h 60° C. | 1 | 1 |

|  |  | Working Example 3 | Comparative Example 3 |
|---|---|---|---|
| Solvent resistance 5 min. Acetone | after 1 h 23° C. | 4 | 4 |
|  | after 24 h 23° C. | 4 | 4 |
|  | after 16 h 60° C. | 4 | 4 |
| Wet scratch resistance Loss of gloss after 10 cycles | after 1 h 23° C. | 13 GU | 17 GU |
|  | after 24 h 23° C. | 15 GU | 19 GU |
|  | after 16 h 60° C. | 14 GU | 17 GU |
| Dry scratch resistance with polishing paper, loss of gloss | after 1 h 23° C. | 29 GU | 63 GU |
|  | after 24 h 23° C. | 56 GU | 71 GU |
|  | after 16 h 60° C. | 47 GU | 67 GU |
| Dry scratch resistance with steel wool, loss of gloss | after 1 h 23° C. | 27 GU | 56 GU |
|  | after 24 h 23° C. | 28 GU | 39 GU |
|  | after 16 h 60° C. | 31 GU | 36 GU |

From the above table it is seen that, relative to the comparative example, consisting of mercaptosilane-containing STPs, the substrates coated with the coating materials of the invention exhibit a somewhat improved wet scratch resistance, but in particular a significantly improved dry scratch resistance, as can be ascertained from a significantly lower loss of gloss. Moreover, the development of hardness by the coating of the invention arrived at the end point more quickly than the coating formulation containing the comparative material, since there is no longer any increase in the pendulum damping.

Application Example 4 and Comparative Example 4

The isocyanate-containing STP of the formula (II) prepared in synthesis example 6 was formulated as follows into a coating material composition of the invention and was compared with a formulation containing the isocyanate-containing STP from synthesis example 8. The formulation corresponds to application example 2 and to comparative example 2. The STP of synthesis example 8 is comparable structurally to the inventive STP of synthesis example 6, except that the silane groups were introduced not via the inventive formamidosilane building blocks, but instead through a 3-mercaptopropyltrimethoxysilane. Both formulations contain the same amount of crosslinkable silane groups (see figures for the silane content in synthesis examples 6 and 8). The performance results obtained allow a comparison to be made of the effect of STPs based on the inventive formamidosilane building blocks relative to a silane building block of the prior art.

|  | Application example 4 | Comparative Example 4 |
|---|---|---|
| Component (A) - Polyol | Setalux ® 1774 SS-65 | |
| Component (B) - STP | Synthesis Example 6 | Synthesis Example 8 |
| Component (D) - Catalyst | X-add ® KR 9006 | X-add ® KR 9006 |
| Component (E) - Flow control agent | Byk ® 331 | |
| Component (F) - solvents | MPA/SN 100 | |
| Quantitative formulation |  |  |
| Setalux ® 1774 SS-65, asf. | 56.23 g | 56.23 g |
| Synthesis Example 6 | 127.34 g | 117.52 g |
| Byk ® 331, 10% in BA | 1.38 g | 1.31 g |
| X-add ® KR 9006, asf. | 2.08 g | 1.96 g |
| MPA/SN 100 (1:1) | 44.00 g | 34.94 g |
| Sura total: | 231.03 g | 211.96 g |

The present test formulas were calculated such that the polyol (A) and the STP (B) and/or the polyisocyanate (C) are crosslinked equimolarly.

In analogy to working example 2 and comparative example 2, again, paint samples were produced and were compared with one another by the methods indicated there. The result is shown by the following table.

|  |  | Application Example 4 | Comparative Example 4 |
|---|---|---|---|
| Pendulum damping | after 1 h 23° C. | 158 s | 48 s |
|  | after 24 h 23° C. | 174 s | 69 s |
|  | after 16 h 60° C. | 200 s | 152 s |
| Solvent resistance 5 min. Xylene | after 1 h 23° C. | 0 | 4 |
|  | after 24 h 23° C. | 0 | 2 |
|  | after 16 h 60° C. | 0 | 1 |
| Solvent resistance 5 min. 1-Methoxyprop-2-yl acetate | after 1 h 23° C. | 0 | 4 |
|  | after 24 h 23° C. | 0 | 2 |
|  | after 16 h 60° C. | 0 | 1 |
| Solvent resistance 5 min. Ethyl acetate | after 1 h 23° C. | 1 | 4 |
|  | after 24 h 23° C. | 1 | 4 |
|  | after 16 h 60° C. | 0 | 4 |
| Solvent resistance 5 min. Acetone | after 1 h 23° C. | 4 | 4 |
|  | after 24 h 23° C. | 2 | 4 |
|  | after 16 h 60° C. | 2 | 4 |
| Wet scratch resistance Loss of gloss after 10 cycles | after 1 h 23° C. | 10 GU | 14 GU |
|  | after 24 h 23° C. | 12 GU | 17 GU |
|  | after 16 h 60° C. | 12 GU | 14 GU |
| Dry scratch resistance with polishing paper, loss of gloss | after 1 h 23° C. | 14 GU | 42 GU |
|  | after 24 h 23° C. | 22 GU | 38 GU |
|  | after 16 h 60° C. | 19 GU | 14 GU |
| Dry scratch resistance with steel wool, loss of gloss | after 1 h 23° C. | 18 GU | 50 GU |
|  | after 24 h 23° C. | 16 GU | 25 GU |
|  | after 16 h 60° C. | 17 GU | 17 GU |

From the table above it is seen that the substrates coated with the coating materials of the invention exhibit significantly improved hardness development as compared with the comparative example consisting of a mercaptosilane-containing STP. It is evident, moreover, that the solvent resistances of inventive working example 4 are improved significantly relative to comparative example 4.

The invention claimed is:

1. A nonaqueous coating material composition comprising
(A) at least one polyol (A),
(B) at least one tertiary formamidosilane-containing compound of the formula (I);

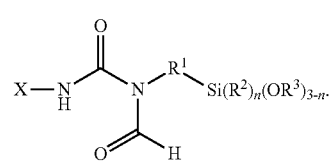

Formula (I)

where in the formula (I):
X is an optionally substituted, linear or branched, aliphatic or alicyclic organic molecule residue;
$R^1$ is an at least divalent, optionally substituted, linear or branched, aliphatic and/or alicyclic structural unit having 1 to 12 carbon atoms, optionally one or more nonadjacent methylene groups is replaced in each case by 0 or S;
$R^2$ and $R^3$ each independently of one another are an optionally substituted, linear or branched, aliphatic and/or alicyclic group having 1 to 12 carbon atoms; and
n is an integer from 0 to 2;
(C) optionally one or more silane-free aliphatic or cycloaliphatic polyisocyanates having free or blocked isocyanate groups,
at least one of the two components (B) and (C) comprises free or blocked isocyanate groups;
(D) at least one catalyst for the crosslinking of the silane groups of component (B);
(E) optionally one or more flow control assistants; and
(F) optionally one or more nonaqueous solvents,
wherein the coating material composition consists of components (A), (B), (C), (D), (E) and (F), wherein component (A) is a polyacrylate polyol, and wherein (C) is an aliphatic polyisocyanate resin based on trimers of hexamethylene diisocyanate having an NCO functionality of 2.8 to 3.6.

2. The coating material composition as claimed in claim 1, wherein component (B) is a tertiary formamidosilane-containing compound of the formula (II):

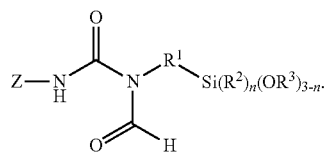

Formula (II)

where in the formula (II)
Z is a molecule residue which consists of a polyisocyanate or an NCO-containing polyurethane prepolymer, at least one NCO group of the stated structures in (i) or (ii) being modified, per molecule, with a secondary formamidosilane so that a compound of the formula (II) is formed; and
$R^1$, $R^2$, $R^3$ and n are as defined in claim 1.

3. The coating material composition as claimed in claim 2, wherein the tertiary formamidosilane-containing component (B) is a polyurethane prepolymer which contains no further free or blocked NCO groups.

4. The coating material composition as claimed in claim 2, wherein the tertiary formamidosilane-containing component (B) is a polyurethane prepolymer which consists of a polyurethane prepolymer based on hexamethylene diisocyanate (HDI) and a polyol, such as 2,2,4-trimethylpentane-1,3-diol, all NCO groups in the polyurethane prepolymer being modified with a secondary formamidosilane, to form a compound of the formula (II).

5. The coating material composition as claimed in claim 2, wherein component (B) is a tertiary formamidosilane of the formulae I or II which is reduced by at least one-NCO group an aliphatic or alicyclic, substituted or unsubstituted polyisocyanate based on a representative selected from tetramethylene 1,4-diisocyanate, pentane 1,5-diisocyanate, hexamethylene 1,6-diisocyanate, 2,2,4-trimethylhexane 1,6-diisocyanate, ethylene diisocyanate, dodecane 1,12-diisocyanate, 3-isocyanatomethyl-3,5,5-trimethylcyclohexyl isocyanate (isophorone diisocyanate, IPDI) and mixtures of the aforesaid polyisocyanates, the isomeric bis(4,4'-isocyanatocyclohexyl)methanes, and also mixtures thereof, the isocyanates being present in each case as monomer, dimer, trimer and/or a polyisocyanate parent structure obtained by urethane, biuret, uretdione and/or allophanate formation.

6. The coating material composition as claimed in claim 1, wherein
(i) $R^1$ is a divalent propylene group (—$CH_2$—$CH_2$—$CH_2$—),
$R^3$ is -methyl or -ethyl and n=0; or
(ii) $R^1$ is a divalent propylene group (—$CH_2$—$CH_2$—$CH_2$—); or
(iii) $R^2$ and $R^3$ each independently of one another are -methyl or -ethyl; or
(iv) $R^1$ is a divalent hexylene group (—$CH_2CH_2CH_2CH_2CH_2CH_2$—).

7. The coating material composition as claimed in claim 1, wherein the tertiary formamidosilane-containing component (B) possesses an average NCO functionality of 2.0 to 5.0, and an isocyanate group content of 5.0 to 50.0 wt %, based on component (B).

8. The coating material composition as claimed in claim 1, wherein the tertiary formamidosilane-containing component (B) is an aliphatic polyisocyanate resin based on hexamethylene diisocyanate (HDI) and reduced by at least one —NCO group.

9. The coating material composition as claimed in claim 1, wherein (i) component (B) contains blocked or free isocyanate groups and component (C) is present, or (ii) component (B) contains no blocked or free isocyanate groups and component (C) is present.

10. An automobile clearcoat or topcoat material comprising a coating material composition as claimed in claim 1.

11. A vehicle body or bodywork component bearing an applied crosslinked coating material composition as claimed in claim 1.

12. A nonaqueous coating material composition comprising
(A) at least one polyacrylate polyol (A),
(B) at least one tertiary formamidosilane-containing compound of the formula (I);

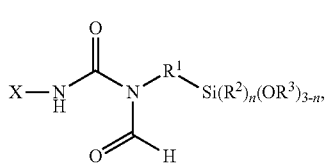

Formula (I)

where in the formula (I):
X is an optionally substituted, linear or branched, aliphatic or alicyclic organic molecule residue;
$R^1$ is an at least divalent, optionally substituted, linear or branched, aliphatic and/or alicyclic structural unit having 1 to 12 carbon atoms, optionally one or more nonadjacent methylene groups is replaced in each case by O or S;

R² and R³ each independently of one another are an optionally substituted, linear or branched, aliphatic and/or alicyclic group having 1 to 12 carbon atoms; and n is an integer from 0 to 2;

(C) optionally one or more silane-free aliphatic or cycloaliphatic polyisocyanates having free or blocked isocyanate groups, at least one of the two components (B) and (C) comprises free or blocked isocyanate groups;

(D) at least one catalyst for the crosslinking of the silane groups of component (B);

(E) optionally one or more flow control assistants; and (F) optionally one or more nonaqueous solvents, wherein (B) is an NCO-free polyurethane based on monomeric HDI, 2,2,4-trimethylpentane-1,3-diol and N-(3-trimethoxysilylpropyl)formamide) or N-(3-Methyldimethoxysilylpropyl)formamide or N-(3-Triethoxysilylpropyl)formamide or N-(3-Methyldiethoxysilylpropyl)formamide, and (C) is an aliphatic polyisocyanate resin based on trimers of HDI having an NCO functionality of 2.8 to 4.5, or wherein (B) is an NCO-free polyurethane based on an aliphatic polyisocyanate resin based on trimers of HDI having an NCO functionality of 2.8 to 4.5 and N-(3-trimethoxysilylpropyl)formamide) or N-(3-Methyldimethoxysilylpropyl)formamide or N-(3-Triethoxysilylpropyl)formamide or N-(3-Methyldiethoxysilylpropyl)formamide, and (C) is an aliphatic polyisocyanate resin based on trimers of HDI having an NCO functionality of 2.8 to 4.5, or wherein (B) is an NCO-free polyurethane based on an aliphatic polyisocyanate resin based on trimers of HDI having an NCO functionality of 2.8 to 4.5 and N-(3-trimethoxysilylpropyl)formamide) or N-(3-Methyldimethoxysilylpropyl)formamide or N-(3-Triethoxysilylpropyl)formamide or N-(3-Methyldiethoxysilylpropyl)formamide, and optionally (C) is an aliphatic polyisocyanate resin based on trimers of HDI having an NCO functionality of 2.8 to 4.5.

* * * * *